US006911954B2

(12) United States Patent
Li

(10) Patent No.: US 6,911,954 B2
(45) Date of Patent: Jun. 28, 2005

(54) METHOD FOR CONSTRUCTING MOBILE WIRELESS ANTENNA SYSTEMS

(76) Inventor: Shidong Li, 29 Fairway Dr., Daly City, CA (US) 94015

( * ) Notice: Subject to any disclaimer, the term of this patent is extended or adjusted under 35 U.S.C. 154(b) by 453 days.

(21) Appl. No.: 10/206,529

(22) Filed: Jul. 26, 2002

(65) Prior Publication Data

US 2003/0073465 A1 Apr. 17, 2003

Related U.S. Application Data

(60) Provisional application No. 60/308,436, filed on Jul. 27, 2001.

(51) Int. Cl.[7] ......................... H01Q 21/00; H04B 17/00

(52) U.S. Cl. .................... 343/853; 455/115; 455/562.1; 342/368

(58) Field of Search ................................ 343/853, 855, 343/742, 770; 455/39, 121, 277.1, 562.1, 115.1, 552; 342/165, 174, 368; H01Q 21/00; H04B 17/00

(56) References Cited

U.S. PATENT DOCUMENTS 6,166,690 A * 12/2000 Lin et al. .................... 342/383
6,584,302 B1 * 6/2003 Hottinen et al. .............. 455/69
2002/0032015 A1 * 3/2002 Kitakado et al. ........ 455/277.1
2003/0040281 A1 * 2/2003 Nakao et al. .............. 455/67.1
2003/0139202 A1 * 7/2003 Doi et al. ................... 455/562

OTHER PUBLICATIONS

Mailloux, R.J., "Phased Array Antenna Handbook", Artech House, Inc., (Boston, London), 1994. 4 sheets.

Hansen, R. C. , "Phase Array Antennas", John Wiley & Sons, Inc., Canada, 1998, 2 sheets.

Litva, J. and Lo, T. K–Y, "Digital Beamforming in Wireless Communications", Artech House, 1996, chapters 2,3,8,9.

Daubechies, I., "Ten Lectures on Wavelets", SIAM, Philadelphia, 1992, 9 sheets.

Heil, C., and Walnut, D., "Continuous and Discrete Wavelet Transforms", SIAM review, 31: pp. 628–666, 1989.

Li, S., "On General Frame Decompositions, Numerical Functional Analysis and Optimizations", 16(9 & 10), pp. 1181–1191, 1995.

* cited by examiner

*Primary Examiner*—Trinh Vo Dinh

(57) ABSTRACT

An antenna system and method for constructing said system from a plurality of antenna elements. An antenna system radiation pattern function is specified. The antenna elements are determined by measurement, simulation or calculation and parameterized according to interelement spacing within the array. The parameterized array elements are collected to form a set that is identified with a frame. A dual frame to the element frame is determined and antenna element weights are computed based on the dual frame and the specified system radiation pattern function. The antenna system is then constructed in accordance with the antenna element weights. The antenna element frame enables high-quality low SLL beams, irregular interelement spacing, arbitrary geometries of linear and planar arrays, time and space arrays, multi-band arrays and inclusion of element phase variations due to differences in element feeds in the constructed antenna system.

29 Claims, 25 Drawing Sheets

Uniform Spacing

50

60

64

74

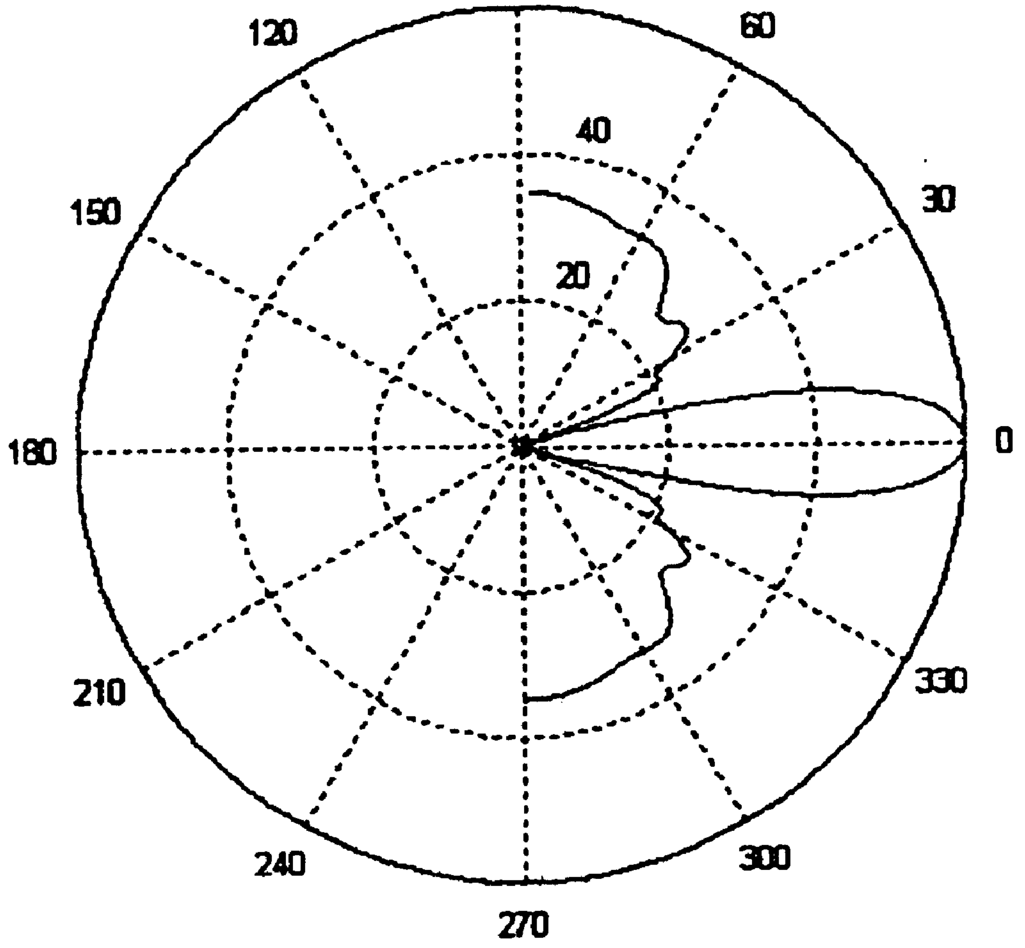
76
Figure 2I (2i)

Typical diagram for Space-Time 2D beamforming

104

160

164

172

174

176

Uniform Linear Array

Uniform Circular Array $$F(\theta)_{comp} = \sum_n \left| A_{n_{PRE}} \right\rangle \left\langle B_{n_{PRE}} \middle| F(\theta)_{comp} \right\rangle$$

METHOD FOR CONSTRUCTING MOBILE WIRELESS ANTENNA SYSTEMS

CROSS-REFERENCE TO RELATED APPLICATIONS

This application is related to and claims the benefit of U.S. Provisional Application Ser. No. 60/308,436, entitled "DESCRIPTION OF VARIABLE-BEAM WIRELESS ANTENNA SYSTEMS", filed on Jul. 27, 2001, which provisional application is incorporated in its entirety by reference into the present application.

FIELD OF THE INVENTION

The present invention generally relates to the construction of mobile and fixed link antenna systems and more particularly to the construction of antenna systems with improved directivity, directive gain, and apertures and improved control over these quantities.

DESCRIPTION OF THE RELATED ART

Today's wireless communications systems for mobile users are facing capacity problems and spectrum scarcity. These wireless communications systems typically employ a mobile switching center (MSC) that controls a plurality of cells to communicate with personal communication devices, such as hand-held portable telephones, portable data terminals, and portable personal digital assistant (PDA) devices that are present in those cells. Each MSC attempts to share the bandwidth assigned to a cell as efficiently as possible among the users (or devices) that are, at a given time, in a MSC cell. A DS-CDMA system, deployed in North America, can accommodate about 1000 users per cell. Even though CDMA has a universal one-cell reuse pattern, only about 1000 devices can be in a MSC cell at a time.

Another system used in Europe and Asia, a TDMA system, has 125 duplex channels with 8 users per channel. This allows 1000 devices, but, typically, adjacent cells in such a system cannot reuse the channels. The 125 channels are, in effect, shared among several cells until they can be reused as cells become sufficiently separated in distance (the cell reuse factor is typically 7), thereby limiting the number of users or devices within the span of cells.

While these systems are currently quite acceptable, the increasing number of devices per user and the number of users, pose difficult problems in the near future. When the number of devices in a cell reaches the limit of the cell, the devices are given degraded service or are denied service until they reach a less busy cell. One solution to this problem is to add cells. However, there is a limit to adding cells due to co-channel interference between cells and the cost of the addition.

Thus, there is a need for a better solution to the increasing utilization of a cell, one that does not require expensive addition of cells or render the existing systems obsolete.

BRIEF SUMMARY OF THE INVENTION

The present invention is directed towards the above need. The present invention includes a method for constructing an antenna system, such as a cell antenna system, that increases the utilization and performance of a cell without requiring the replacement of the mobile system or the addition of a new cell. An antenna system in accordance with the present invention has improved directivity and directive gain and improved control over these parameters so that many more non-interfering channels in the cell are possible, thereby increasing the capacity and performance of the cell.

A method in accordance with the present invention is a method for forming a beam for an antenna system that includes a plurality of antenna elements. The method includes specifying an antenna system radiation pattern function, determining element radiation pattern functions, determining the value of a spacing parameter, forming a frame from the element radiation pattern functions and finding a dual of the frame, and determining the element weight coefficients for the elements. The antenna system radiation pattern function describes the transmission or reception beam of the antenna system. The element radiation pattern functions each include a basic element pattern specification, a frequency of operation and at least one spacing parameter that specifies the location of the element in the antenna system. The frame that is formed from the element radiation pattern functions arises from a condition, called the frame condition, imposed on the set of element radiation pattern functions. The element weight coefficient for each antenna element is based on the elements of the dual frame and the specified antenna system radiation pattern function. More particularly, the element weight coefficients result from the inner product of the dual frame with the specified antenna system radiation pattern function. The inner product is defined because of the frame condition imposed.

An apparatus in accordance with the present invention includes an antenna system whose beam is formed by means of the method of the present invention.

One advantage of the present invention is that it is easy to include mutual coupling between elements into a description of each antenna element.

Another advantage is that non-uniform spacing of the elements is easily accommodated by the description of the antenna elements.

The other advantage of the present invention is that field re-calibration can be carried out if element gain changes or element failures or both are detected. This allows the array antenna to perform its function as optimally as possible and mobile systems to function without having to replace or repair the antenna immediately.

Yet another advantage of the present invention is that computations involved in the method are quick so as to be suitable for re-calibration and reconfiguration of an antenna system after the system has been deployed.

Yet another advantage of the present invention is that element functions can include cabling, other circuit delays or other irregularities in the currents driving each array element.

BRIEF DESCRIPTION OF THE DRAWINGS

These and other features, aspects and advantages of the present invention will become better understood with regard to the following description, appended claims, and accompanying drawings where:

FIG. 2I shows a conventional beam pattern for a linear array of elements with a reduction in gain of one of the elements;

DETAILED DESCRIPTION OF THE INVENTION

The present invention relates to a method for constructing an improved cell antenna system that avoids many of the drawbacks of existing cell antenna systems. To avoid the drawbacks of existing cell antenna systems and achieve the advantages of the present invention, a new approach is taken in the construction of the antenna system radiation pattern F for an antenna array. Typically, the type of element of an antenna array is known, and the far field radiation pattern of that element is approximated based on a model of the element. However, combination of the elemental field radiation patterns to achieve any desired radiation pattern for the antenna array is limited in accuracy and controllability because many simplifying assumptions must be made to make the problem tractable. Some simplifying assumptions include the regular spacing of elements, the minimum allowable spacing of elements, such as ½ λ (wavelength), simplified elemental radiation pattern functions, and avoidance of unpredictable time delays for the elemental excitation function.

For example, in one technique for synthesizing a linear antenna array, it is assumed that a N−1 degree Chebyshev polynomial should be used for pattern factor of the array. The side lobes are mapped to one region of the polynomial, the oscillatory part, and the main beam is mapped to a different region of the polynomial. Spacing of the elements is ½ λ. If spacing of less than ½ λ is desired, more restrictions are imposed, such as that the number of elements must be an odd integer.

The present approach makes none of these simplifying assumptions to compute from a given elemental radiation pattern the best possible approximation to a given array radiation function for the desired number of elements.

The method of the present invention uses vectors and matrices to compute the relevant parameters, which are the antenna excitation coefficients. These matrices are well-suited to current digital signal processors and other common microprocessors.

Figure 1:
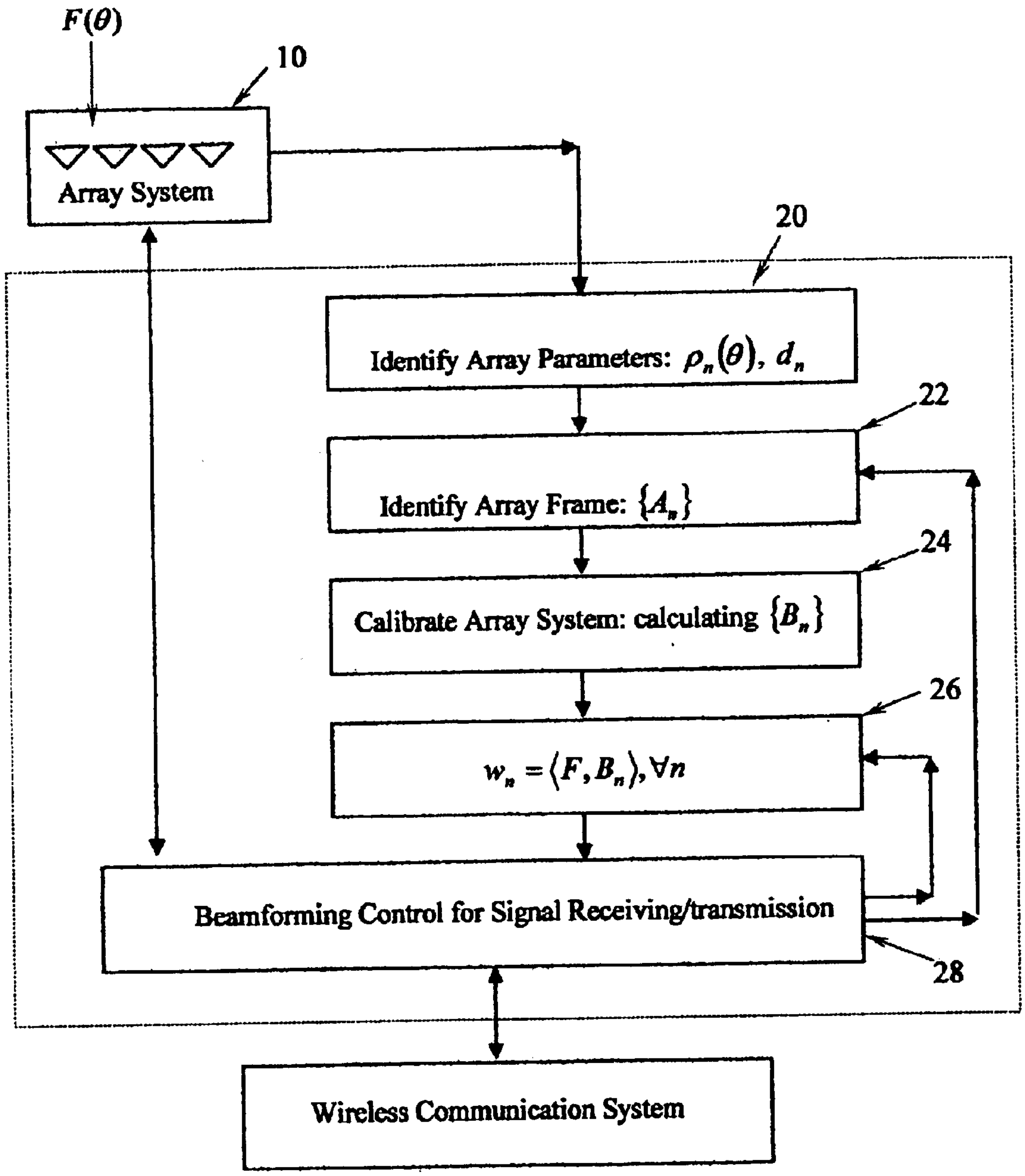
FIG. 1 shows a flow chart of the steps, in accordance with the present invention, for constructing an antenna system.
Figure 2A:
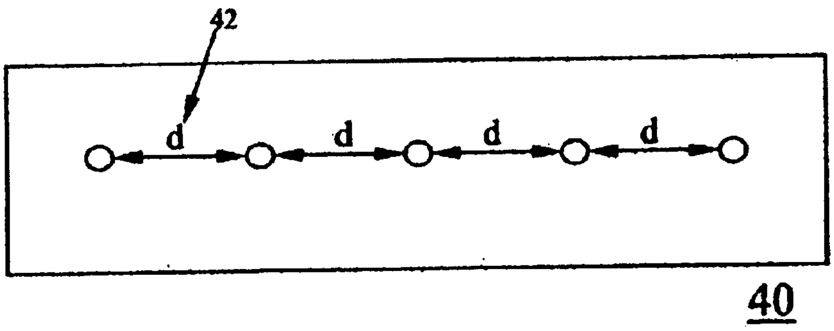
FIG. 2A shows a linear array of antenna elements with uniform spacing between adjacent elements.
Figure 2A:
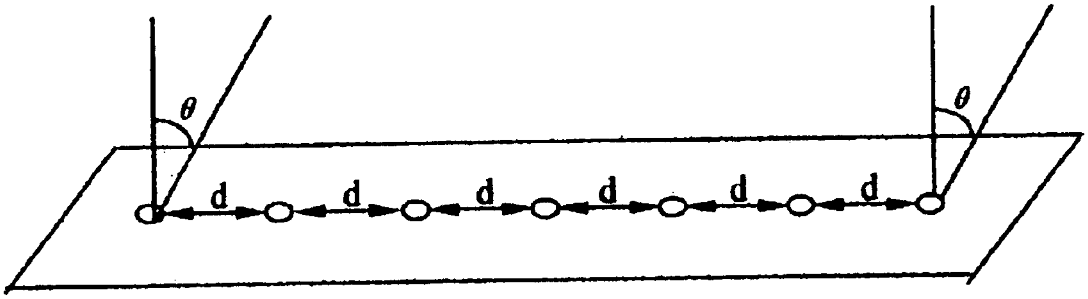

FIG. 1 shows a flow chart of the steps, in accordance with the present invention, for constructing an antenna system 10 having a desired far-field radiation pattern $F(\theta)$ to be transmitted or received by the antenna system, where $\theta$ is a spatial angle as specified in FIG. 2A. The spatial angle $\theta$ gives the angle of a plane wave to a vector normal to the xy plane in which the array is positioned. In the first step 20, the antenna array parameters are identified. The array element parameters include, at least, the element spacing, $d_n$, and a basic element pattern $\rho_n(\theta)$ for each element n.

In step 22, the elemental array parameters are collected into a set of functions and identified as a frame $\{A_n\}$ spanning a function space (Hilbert space) in which the desired radiation pattern $F(\theta)$ is defined, where $\theta$ is a spatial angle. In general, F may be a function of more than spatial angle, coordinate or a time parameter. A common type of Hilbert space is, for instance, a complete inner-product space of square-integrable, measurable, complex-valued functions $f$ on the real numbers where $f$ is a map from the field of real numbers to the field of complex numbers, $$\left\{f : R \to C : \langle f \mid f\rangle = \|f\|^2 = \int_{-\infty}^{+\infty} dt\,|f(t)|^2 < \infty\right\},$$

and where the inner product satisfies the conditions of non-negativity $\|f\| \geqq 0$, hermicity $\overline{\langle f|g\rangle} = \langle g|f\rangle$, and linearity $\langle f|cg+h\rangle = c\langle f|g\rangle + \langle f|h\rangle$. Frames in the function space can be redundant, are not necessarily orthogonal, and thus, do not necessary support unique representations of functions in function space.

In step 23, a dual frame $\{B_n\}$ is determined. With the dual frame known, the system radiation pattern function can be expressed in two ways based on the two forms of the unity operator in the function space. The two forms of the unity operator are:

$$I = \sum_n |A_n\rangle\langle B_n| \tag{1}$$

$$I = \sum_n |B_n\rangle\langle A_n|, \tag{2}$$

where Dirac notation is used for a bra $\langle\bullet|$ and a ket $|\bullet\rangle$, and the bracket $\langle\bullet|\bullet\rangle$ is the inner product defined for the function space. In one version of the present invention, the dual frame $\{B_n\}$ is the standard dual frame, but this is not required. There are many other dual frames that can be used without departing from the present invention. The desired radiation pattern $F(\theta) \in \text{span}\{A_n\}$ can be expressed as either, using the two forms of the unity operator:

$$|F(\theta)\rangle = \sum_n |A_n\rangle\langle B_n|F(\theta)\rangle \text{ or} \tag{3}$$

$$|F(\theta)\rangle = \sum_n |B_n\rangle\langle A_n|F(\theta)\rangle. \tag{4}$$

Equation (3) expands the function $F(\theta)$ (vector) in terms of the given frame $\{A_n\}$ and equation (4) expands the function in terms of the dual frame $\{B_n\}$. Because the frame $\{A_n\}$ is given, equation (3) is used to synthesize the desired radiation function. The inner product $<A_n|F>$ is the value of the coefficient mapping operator T when operating on the function F, i.e., $TF=<A_n|F>$. The coefficient mapping operator T analyzes the function $F(\theta)$ in terms of the given frame $\{A_n\}$, by giving the amount of each element $A_n$ in the given function $F(\theta)$. The quantities $<B_n|F>$ are called the array controlling weights $w_n$ herein (also known as array excitation coefficients) and give the amount of each element $B_n$ in the given function $F(\theta)$ .

As stated above, for step 24, in either expression, the dual frame $\{B_n\}$ is needed. The dual frame can be computed by using another operator in the function space, the frame operator $$G = T^*T = \sum_n |A_n\rangle\langle A_n|,$$

where T* is the adjoint of the coefficient mapping operator T. The frame operator converts components of the dual frame $\{B_n\}$ to components in the frame $\{A_n\}$ in the same function space. That is, $$GB_n=A_n \tag{5}$$ and $$B_n=G^{-1}A_n \tag{6}$$

Thus, one way of computing the dual frame $\{B_n\}$ requires determining the inverse of G. It should be remarked that if the frame $\{A_n\}$ forms an orthonormal basis, then G=I and a dual frame $\{B_n\}$ is not needed.

To ensure that the frame operator is invertible, the frame condition, $CI \leqq G \leqq DI$ is required, where C and D are fixed positive constants. This condition places bounds on the eigenvalues of the frame operator thereby insuring that G has an inverse $G^{-1}$, i.e., $G^{-1}G=I$. It is known that, in finite dimensional spaces, $\{A_n\}$ is always a frame of its span: $\text{span}\{A_n\}$ satisfying the frame condition.

The inverse $G^{-1}$ can be approximated as $H_N$ according to the following recursion formula $$H_N=aI+(I-aG)H_{N-1} \tag{8}$$

In this recursion formula, the parameter $0<\alpha<1$ which is derived from the Von Newman operator inverse, G is the frame operator and I is the identity matrix. An alternative way of computing a dual frame $\{B_n\}$, specifically, the standard dual frame, is by forming the pseudo-inverse of the matrix representation A of $\{A_n\}$, i.e., $B=(A^*A)^{-1}A^*$ where $A^*$ is the adjoint of A and B is the matrix representation of the standard dual frame $\{B_n\}$.

Thus in step 26, with the dual frame $\{B_n\}$ determined, the array controlling weights $w_n$ are computed and used to synthesize the desired radiation pattern $F(\theta)$ from the given elements $\{A_n\}$. Thus $$w_n=<B_n|F(\theta)>=((A^*A)^{-1}A^*)_nF(\theta). \tag{9}$$

It should be noted that because of the finite number of antenna elements $$\{A_n\}_{n=0}^{N-1}$$

for constructing the array, it is preferred that the specification of the system radiation pattern $F(\theta)$ and the selection of the element frame be performed in a way that takes into account the number of elements and the number and spacing of the set of sampling angles, $\{\theta_0 \ldots \theta_m\}$. A first way of specifying the radiation pattern $F(\theta)$ is to assign the value of $F(\theta)$ at N evenly spaced sampling angles, where N is the number of antenna elements in the array. It is best, in this assignment, to align the peak value and null values of $F(\theta)$ at the sample points.

A second way of specifying the radiation pattern $F(\theta)$ is to over-sample the pattern. This is done by setting a value L, $L \leqq N$, and assigning the desired value of $F(\theta)$ at each of the L evenly spaced sampling angles. The element frame $$\{A_n\}_{n=0}^{N-1}$$

is then treated as a sub-frame in the space spanned by L array elements, with the additional (L−N) elements having 0 weight. This technique is needed when a narrower beam is required at the sacrifice of higher side lobe levels.

A third way of specifying $F(\theta)$ is to use L=N or slightly larger than N, and assign the desired values of $F(\theta)$ on L non-uniformly spaced sampling angles with a concentration (denser distribution) of sampling angles in the main beam area. This technique should be used when a narrower beam width and lower SLL are both required.

A preferred generating function for evaluating the system radiation pattern at certain sampling angles is $$F(\theta) = 10^{\exp\left(-\frac{|\theta|^8}{\text{sigma}}\right)}$$

where "sigma" is a parameter that further controls the shape, the beamwidth as well as the sidelobe level and is a function of N. For instance, when N=4, sigma typically takes value of 1 to 4. The angle $\theta$ takes discrete values on the sample points distributed in the interval $(-\pi, \pi)$ in ways as described.

In accordance with the present invention, the array weights generating a given radiation pattern $F(\theta)$ are generally non-unique in large arrays (when array element spacing is less than ½-wavelength, and/or when N>L, where N is the number of array elements, and L is the number of sampling points in the array beam pattern $F(\theta)$). In such a case, an element of the (general) dual array frame $\{B_n\}$ is given by $$B_n = B_n^0 + C_n - \sum_{m=0}^{N-1} \langle B_m^0 | A_n \rangle C_m, \tag{10}$$

where $C_n \equiv C_n(\theta)$, $(n=0, 1, \ldots, N-1; \theta=\theta_0, \theta_1, \ldots, \theta_{L-1})$ is a free sequence of vectors, and $$\{B_n^0\}$$

is the standard dual array frame. In actual implementation, equation (10) is also written in matrix form directly. Once a dual array frame is selected, the corresponding array weight vector is then determined by equation (9).

In the following specific applications, antenna elements in an array are typically assumed to be placed in the horizontal direction (except for the planar array). Therefore, beam angle parameters are simplified to one parameter θ, in general.

Linear Array

FIG. 2A shows a linear array 40 of antenna elements with uniform spacing 42 between adjacent elements. To construct a beam for this linear array, in accordance with the present invention, the following steps are taken. First, the basic element patterns $\rho_n(\theta)$ are measured, modeled, or specified. Measurement gives the best results because the measured pattern $\rho_n(\theta)$, in an actual linear array, includes mutual inductive and capacitive coupling from the other elements. Alternatively, the basic element patterns and their mutual couplings can be modeled. Another alternative is to specify ideal basic element patterns without regard to mutual couplings. This alternative is not the most accurate, but may yield acceptable results in some circumstances.

In the next step, the element phase differences are measured based on the cables used and their various lengths for each element. These phase differences are then translated into effective distances $d_n$ for each element relative to the $0^{th}$ element, which is designated the reference element. The frame $\{A_n\}$ then becomes $\{\rho_0(\theta)e^{j\beta d_0 \sin(\theta)}, \rho_1(\theta)e^{j\beta d_1 \sin(\theta)}\}$, for a two element array, where $\rho_n(\theta)$ is the basic element radiation pattern, the factor $\exp(j\beta d_1 \sin(\theta))$ provides the phasing information for an element, $\beta=2\pi/\lambda$ is the wave number at the frequency of operation, and $d_n \sin\theta$ is the distance term relative to the $0^{th}$ element and $d_0=0$, and θ is the spatial angle a plane wave makes with a normal to the plane in which the element is located.

Next, the frame operator G is determined in matrix form. Assume that the angle θ is sampled at three angles $\{\theta_0, \theta_1, \theta_2\}$, then the matrix A is $$A = \begin{bmatrix} \rho_0(\theta_0) & \rho_0(\theta_1) & \rho_0(\theta_2) \\ \rho_1(\theta_0)e^{j\beta d_1 \sin\theta_0} & \rho_1(\theta_1)e^{j\beta d_1 \sin\theta_1} & \rho_1(\theta_2)e^{j\beta d_1 \sin\theta_2} \end{bmatrix}.$$

Then $G=A^H A$ in matrix form, where the superscript H stands for Hermitian transpose. The actual matrices have a size that is based on the number of sampling angles used to specify the system radiation pattern F(θ).

The inverse frame operator $G^{-1}$ is then determined from either the iteration formula or computed directly and applied to calculate the dual frame components $B_n$. One can also calculate the pseudo-inverse of the matrix $A^H$ to obtain the standard dual frame B in matrix form.

With the dual frame known, the weights $w_n=\langle B_n|F\rangle, \forall n$ are finally determined. In matrix form, W=BF. These weights are the element coefficients used to construct the array. The computation to find the weights is an inner product of two small matrix/vectors, the size of each depending on the number of sampling angles used to specify F(θ). This means that the computation can be very fast, even faster than what is needed in "real-time" beamforming and signal identification. Ultimately, the speed of the computation depends on the beamwidth requirement of the application.

As an example, with uniform sampling for 3 angles, the matrix A is given by $$A = \begin{bmatrix} -0.8776 + 0.0000i & 1.0000 & -0.8776 - 0.0000i \\ 0.8776 & 1.0000 & 0.8776 \end{bmatrix},$$

where it is assumed that each element has a basic pattern function $\rho_n(\theta)=\cos(\theta)$, n=0, 1. The standard dual frame B in matrix form is given by $$B = \begin{bmatrix} -0.2849 + 0.0000i & 0.5000 + 0.0000i & -0.2849 - 0.0000 \\ 0.2849 + 0.0000i & 0.5000 - 0.000i & 0.2849 + 0.000i \end{bmatrix}.$$

With three sampling angles, the sampled beam pattern is F=[0, 1, 0]. Therefore, the array control weight vector W is given by $$W = BF = \begin{bmatrix} 0.5000 + 0.0000i \\ -0.5000 - 0.000i \end{bmatrix}.$$

It should be noted that, in the above method, mutual couplings can be included in the element radiation functions $\rho_n(\theta)$ used in the beamforming process, thereby making the resultant beam more realistic and of a higher quality.

Figure 2B:
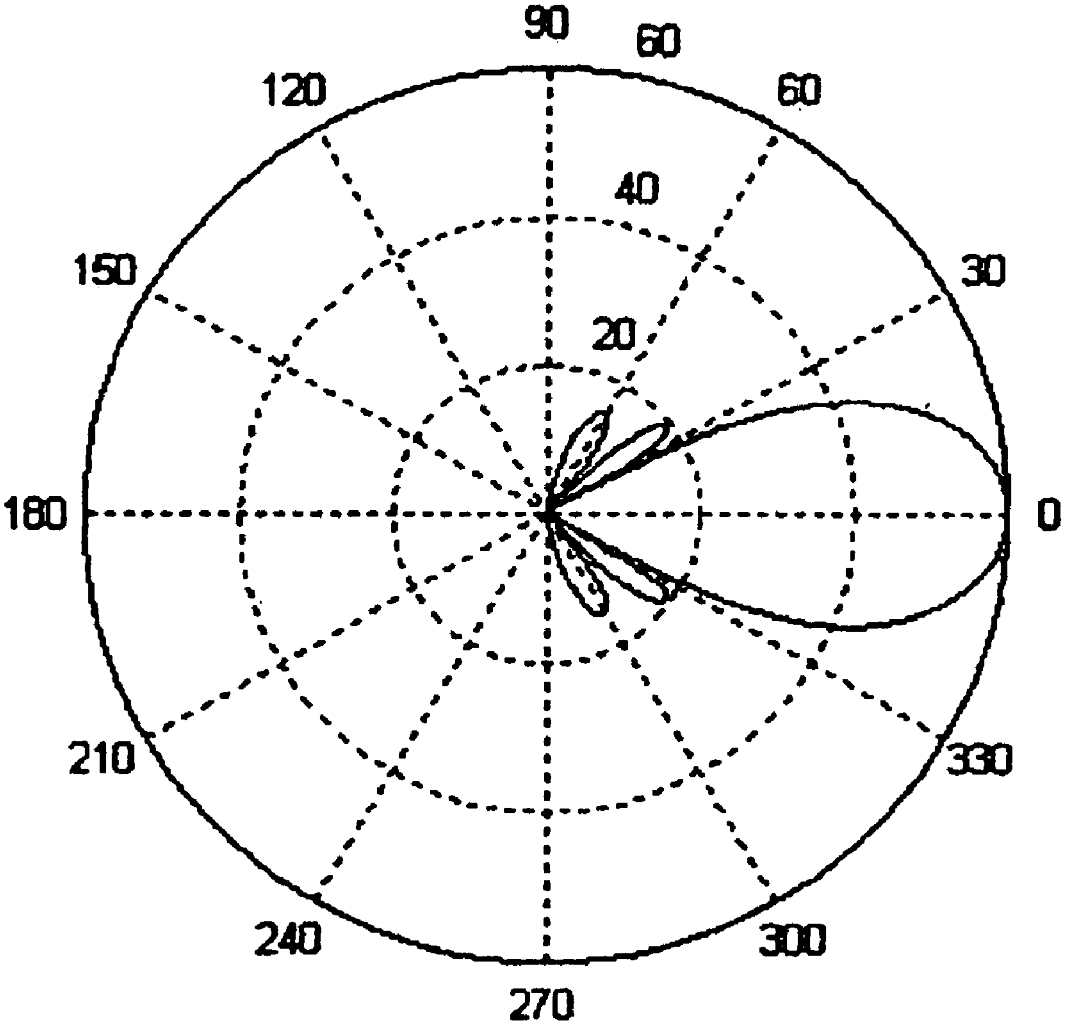
FIG. 2B shows the beam pattern for the linear array of FIG. 2A.

In one embodiment of the present invention, the distance $d_n$ is uniform between adjacent elements. FIG. 2B shows the beam pattern 50 for the linear array of FIG. 2A.

Figure 2C:
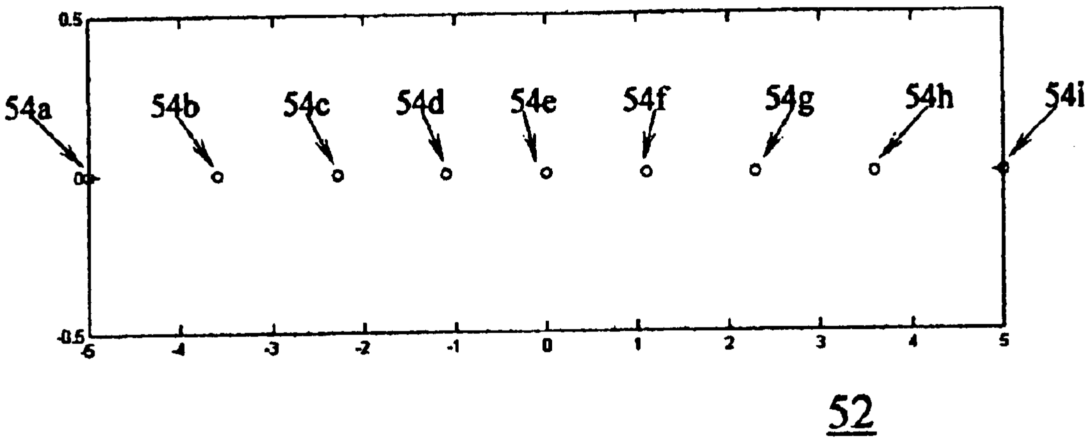
FIG. 2C shows a linear array of antenna elements with non-uniform placement of elements.

In another embodiment, the distance $d_n$ need not be the same for each element, because the frame approach does not require uniform sampling of adjacent spatial points to reconstruct the desired antenna radiation pattern. Also, because non-uniform spacing between adjacent elements is easily allowed, spacing variations can include mechanical, cable length, or connection variations for each element. Thus, there is no need for precision manufacturing of antenna hardware systems and no need for costly delay compensation circuits. FIG. 2C shows a linear array of antenna elements with non-uniform placement of elements. In FIG. 2C the spacing parameters for the elements 54*a–i* is given by:

$d_n/\lambda$=[−5.0000 −3.6000 −2.3000 −1.1000 0 1.1000 2.3000 3.6000 5.0000]

Figure 2D:
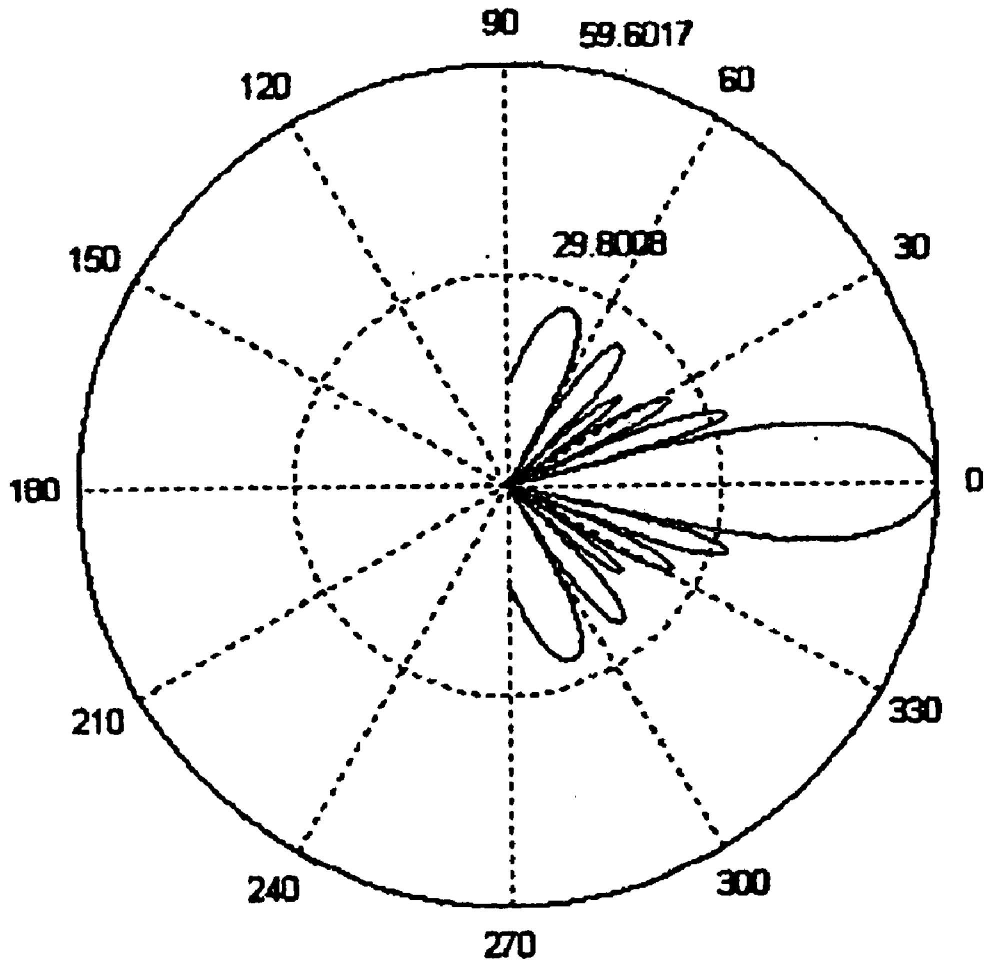
FIG. 2D shows a beam pattern for the linear array of FIG. 2C.
Figure 2E:
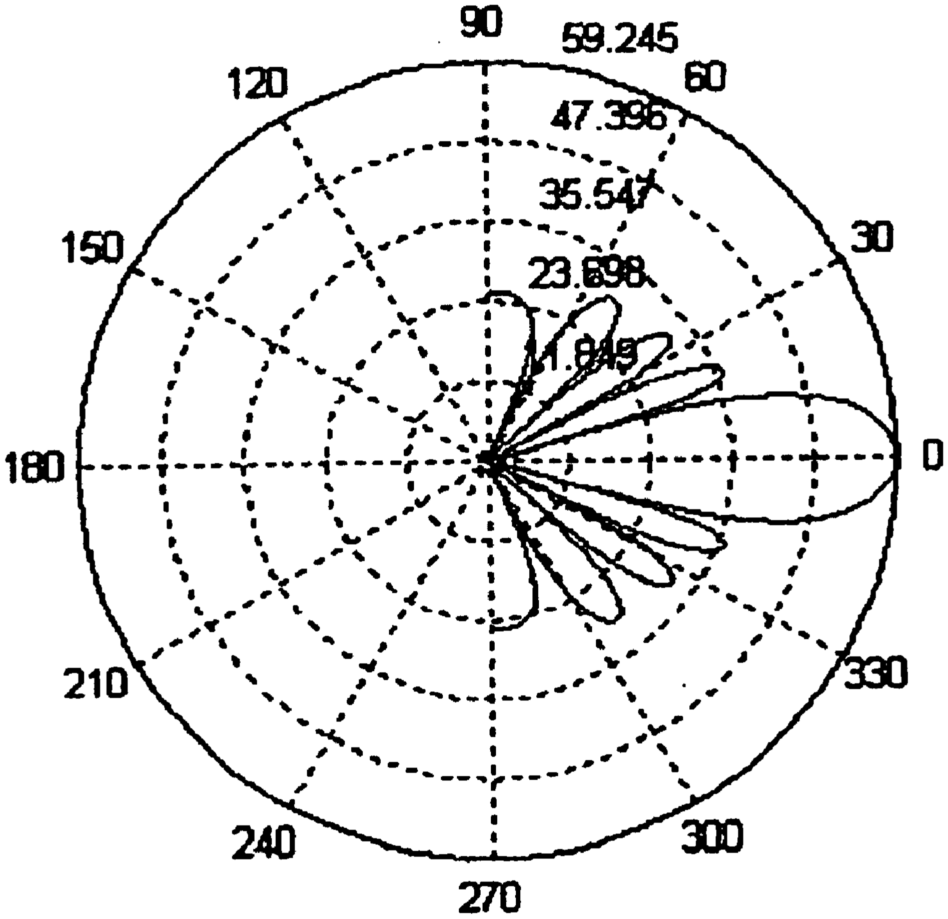
FIG. 2E shows a beam pattern for the linear array with uniformly spaced elements and all others being identical to that of FIG. 2C.

FIG. 2D shows a beam pattern 60 for the linear array of FIG. 2C and FIG. 2E shows a beam pattern for the linear array with uniformly spaced elements and but otherwise identical to that of FIG. 2C. Comparing FIG. 2D and FIG. 2E reveals that an improved beam results from the non-uniformly spaced elements of FIG. 2C. Besides the narrower (main) beam width, the SLL for the beam in FIG. 2D is −30 dB and the SLL for the beam in FIG. 2E is −22 dB. Thus, the beam in FIG. 2D is better by 8 dB.

Figure 2F:
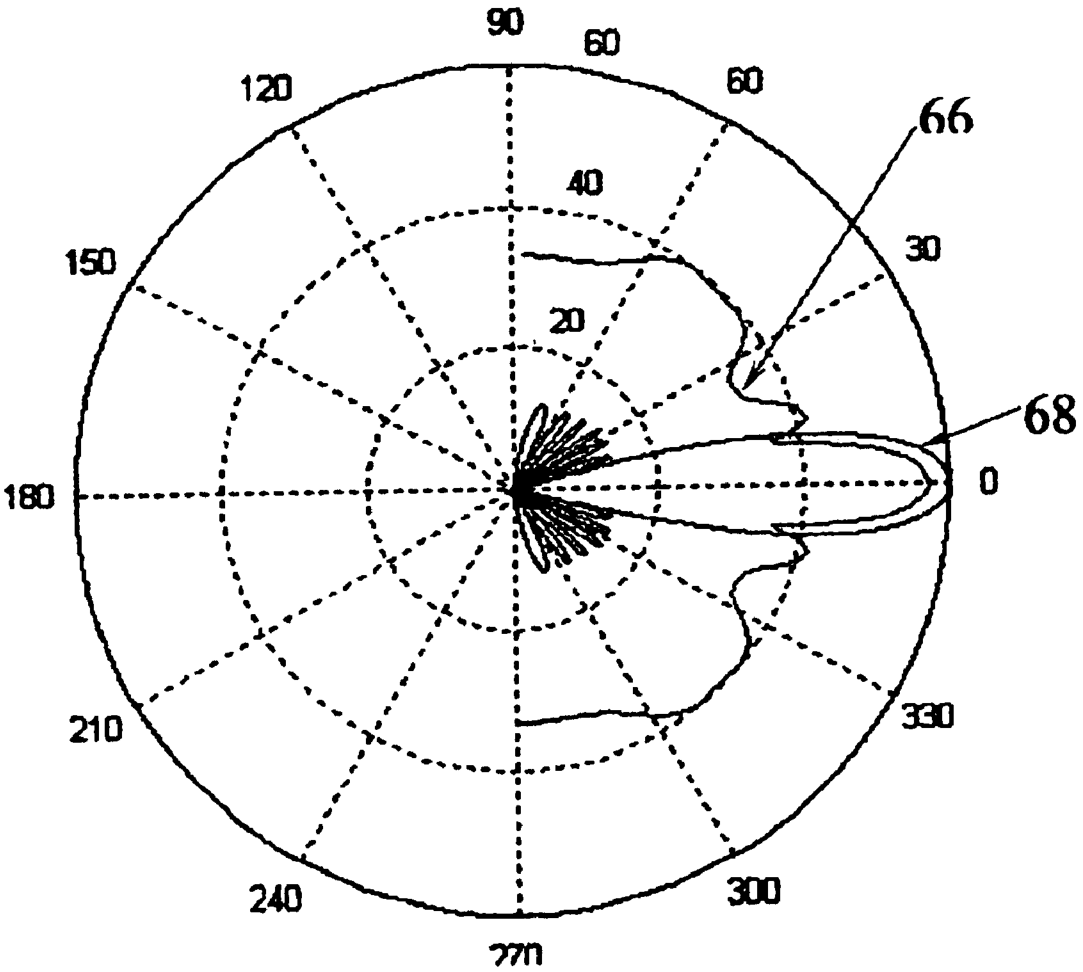
FIG. 2F shows a beam pattern for a linear array of elements with element failures.
Figure 2G:
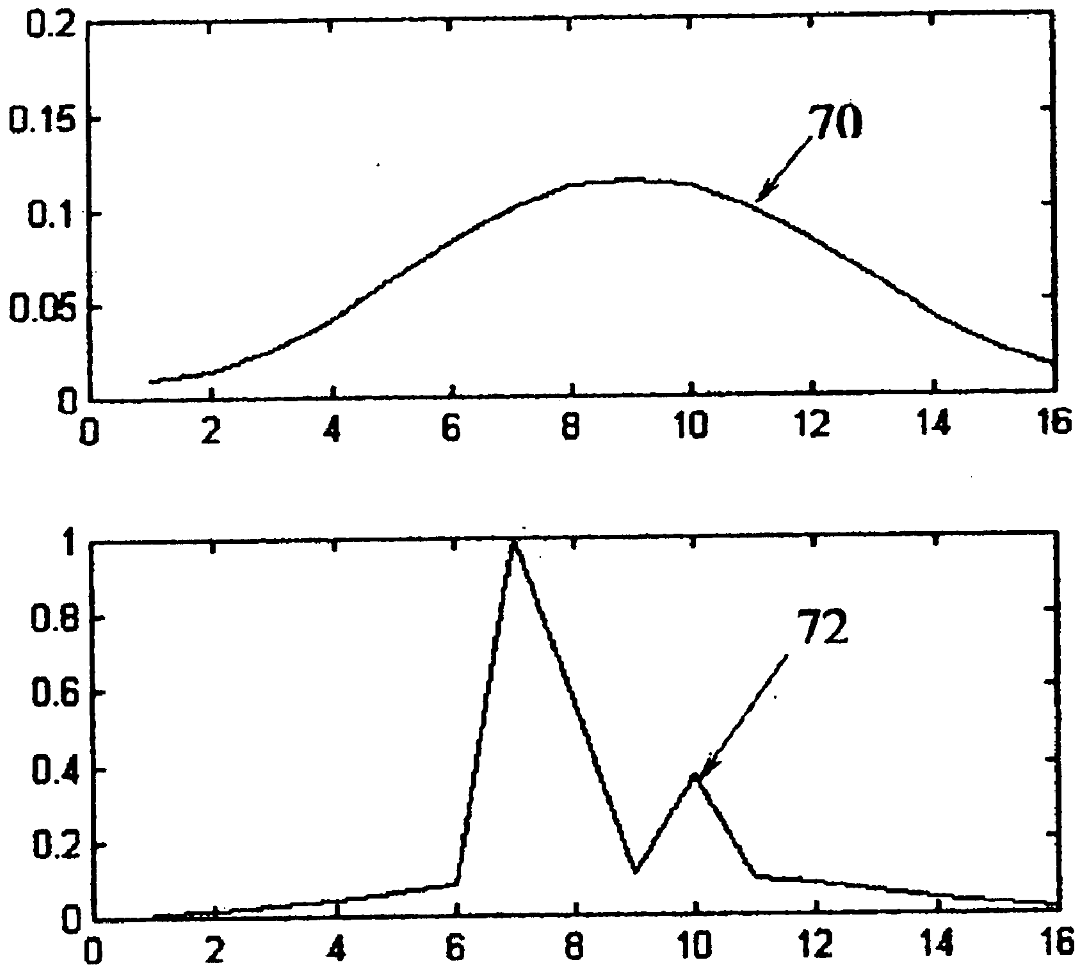
FIG. 2G shows conventional element weights and element weights computed in accordance with the present invention for the corrected beam pattern in FIG. 2F.

Moreover, because of the ease of handling non-uniform spacing between adjacent elements, a quick recomputation of the weights $w_n$ is possible if one (or more) of elements of the array is subject to a gain change or loss of a cable connection or failure. This has the advantage that the antenna system need not be repaired immediately on site in order to keep the mobile system functioning, which translates into savings in operation cost. The antenna radiation pattern for the system is simply re-constructed from the remaining elements. If and when the altered or failed element is made operational, the element weights can again be recomputed to engage the now operational element. FIG. 2F shows a beam pattern 66 computed using conventional element weights and a beam pattern 68 computed with weights in accordance with the present invention, for a linear array of 16 elements with gain variations in three of the elements. FIG. 2G shows conventional element weights 70 and element weights 72, in accordance with the present invention. As is clearly shown, the element weights 72 correctly compensate for the elements affected by the gain variation by properly boosting or attenuating the weights of neighboring elements.

Figure 2H:
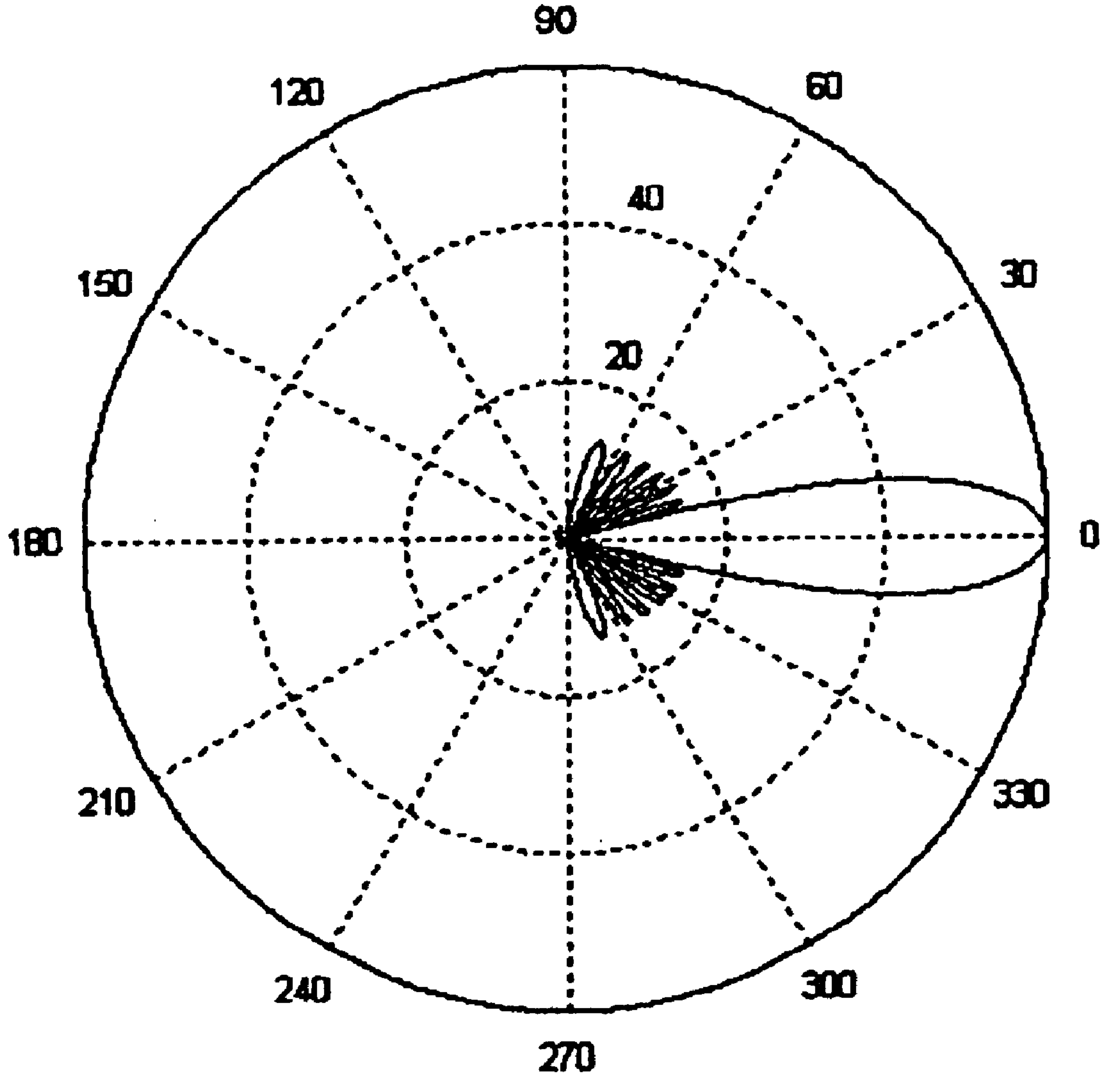
FIG. 2H shows a beam pattern, in accordance with the present invention, for a linear array of elements with a reduction of gain of one of the antenna elements.
Figure 2J:
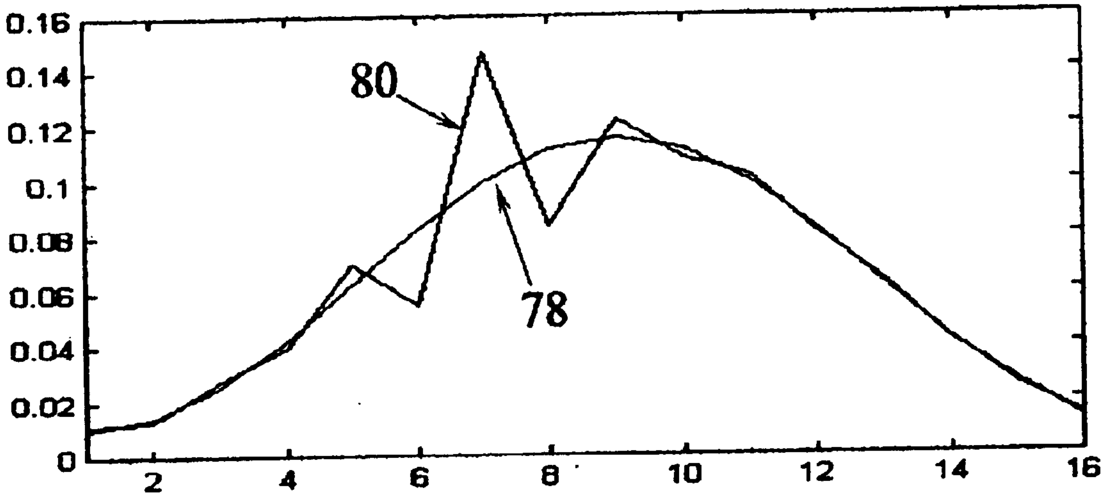
FIG. 2J shows a comparison of conventional element weights with element weights in accordance with the present invention, for a linear array of elements with a reduction in gain of one of the elements.

FIG. 2H shows a beam pattern 74, in accordance with the present invention, for a linear array of elements with a reduction of gain of one of the antenna elements. FIG. 21 shows a conventional beam pattern 76 for a linear array of elements with a reduction in gain of one of the elements. As is evident from the beam patterns, the beam of the present invention has far low SLL than a beam using prior art element weights. FIG. 2J shows a comparison of conventional element weights 78 with element weights 80 in accordance with the present invention for a linear array of elements with a reduction in gain of one of the elements, again indicating how the present invention compensates for the loss in gain of one of the elements, by adjusting the neighboring weight factors.

Circular Array

Figure 3:
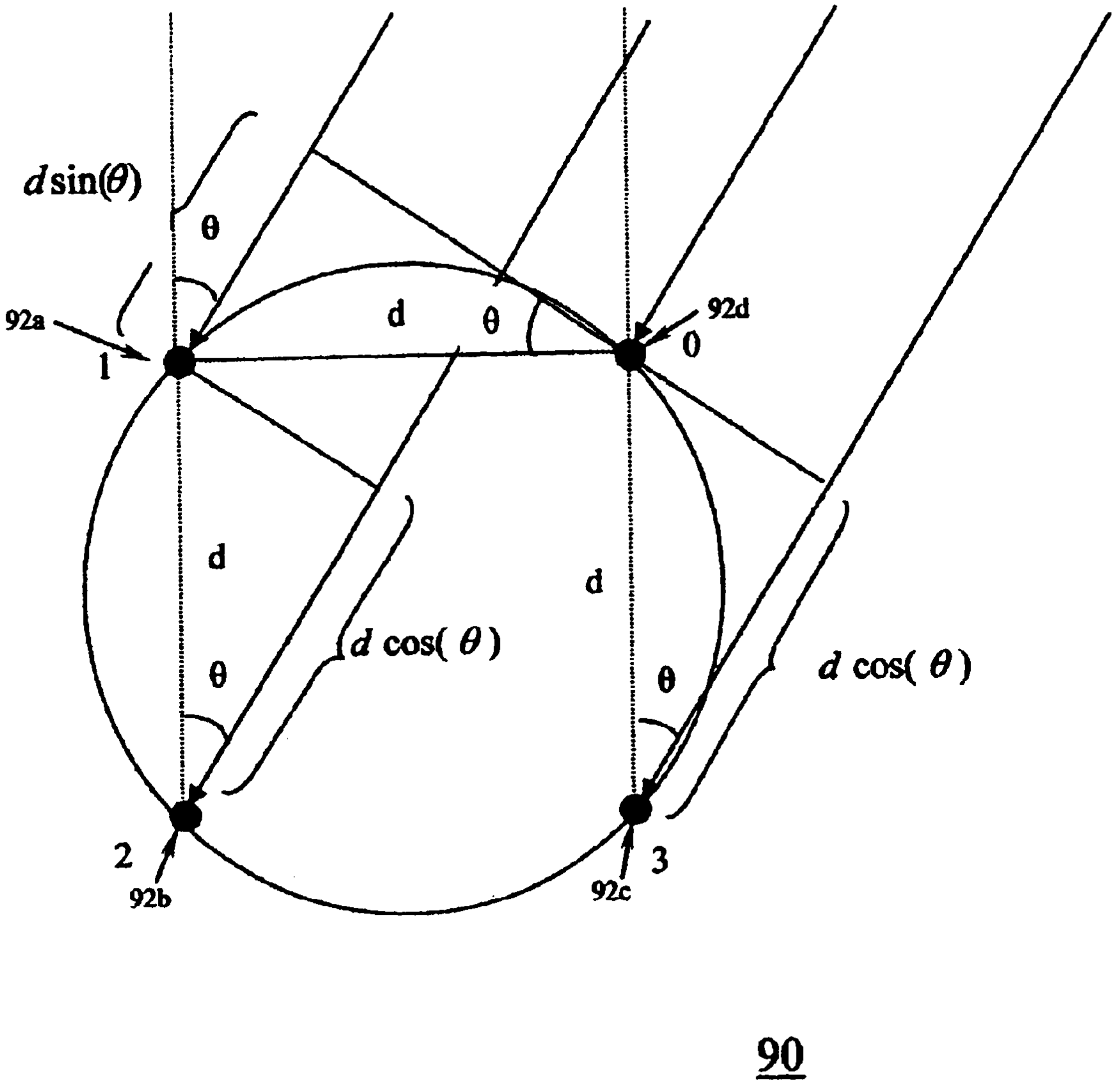
FIG. 3 shows a circular array of antenna elements.
Figure 4:
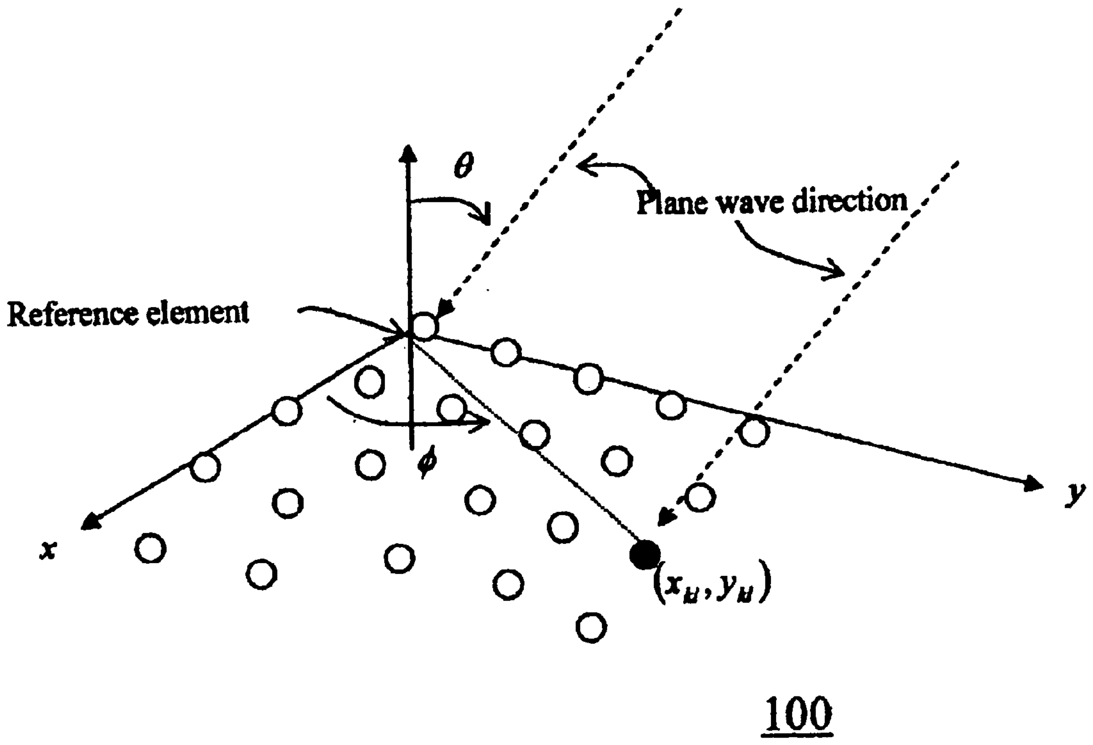
FIG. 4 shows a planar array of antenna elements.

One other consequence of the ability to handle non-uniform spacing is that a variety of other geometric arrangements of arrays are easily accommodated. For example, FIG. 3 shows a circular array 90 of antenna elements. Taking the simple case in which antenna elements 92*a–d* are equally spaced (though this spacing is not essential) on the circumference of a circle, analysis shows that the frame of antenna elements is $$\{A_n\}=\{\rho_0(\theta),\ \rho_1(\theta)exp(j\beta d\ \sin\ \theta),\ \rho_2(\theta)exp(j\beta d(\sin\ \theta+\cos\ \theta),\ \rho_3(\theta)exp(j\beta d\ \cos\ \theta\},$$

where d is the length of the chord between adjacent elements, and θ, as shown in FIG. 4, is the angle of a plane wave relative to the array. A circular array 90 of antenna elements 92*a–d* can be extended to include an irregular spacing of adjacent elements along the circumference of the circle as well. This simply changes the delay or phase differences of the planar wave received at (or transmitted from) each antenna element. The techniques involved in the case of the circular array indicate that virtually any planar geometry can be accommodated by the methods of the present invention because of its ability to handle irregular spacing of adjacent elements. More specific treatment of a general planar geometry is set forth below.

Planar Array

FIG. 4 shows a planar array 100 of antenna elements. Construction of a planar array, in accordance with the present invention, is similar to the linear array. However, the basic element patterns $\rho_{kl}(\phi,\theta)$ are a now a function of two spatial angles φ,θ and two distances $x_{kl},y_{kl}$ (as shown) which locate the element in the plane of the array. Again, adjacent elements need not have uniform element positions $x_{kl},y_{kl}$. The spacing can be different for any element, thereby including spacing irregularities and mechanical, or cable length variations into the process. The array frame for a planar array is $$\{A_n\}=\{\rho_{kl}(\phi,\theta)\exp(j\beta(x_{kl}\cos\phi\sin\theta+y_{kl}\sin\phi\sin\theta))\}_{k=0,l=0}^{K-1,L-1},$$

where there are K elements in one direction and L elements in the orthogonal direction.

It should be noted that a planar array is an alternative way to handle an array with arbitrary geometry, e.g., circular or ring arrays or hexagonal arrays. For example, the antenna elements of a circular array are handled simply by considering the circular array to be in a horizontal plane. In this case, the angle θ is set to 90° in the above equation and the angle φ gives the direction of the plane wave for transmission or reception. It is easy to see that this adjustment causes the planar array frame to be the same as the frame for the circular array given above.

The steps involved to setup a planar array include measuring, modeling or specifying the basic element patterns $\rho_{kl}(\theta,\phi)$, measuring the element phase differences based on the cables connected to the elements and their lengths, and translating the phase differences into spacing parameters $\Delta x_{kl},\Delta y_{kl}$ to be added to the position parameters $x_{kl},y_{kl}$. Next, the frame operator G is formed, inverted (or a pseudo-inverse is carried out as specified in the discussion of linear arrays) and applied to the array frame to compute the dual frame and finally, the array controlling weights $w_n=\langle B_n|F(\theta,\phi)\rangle$ are determined from the dual frame and the system radiation pattern F(θ,φ).

Spatial-Time Beamforming

Figure 5:
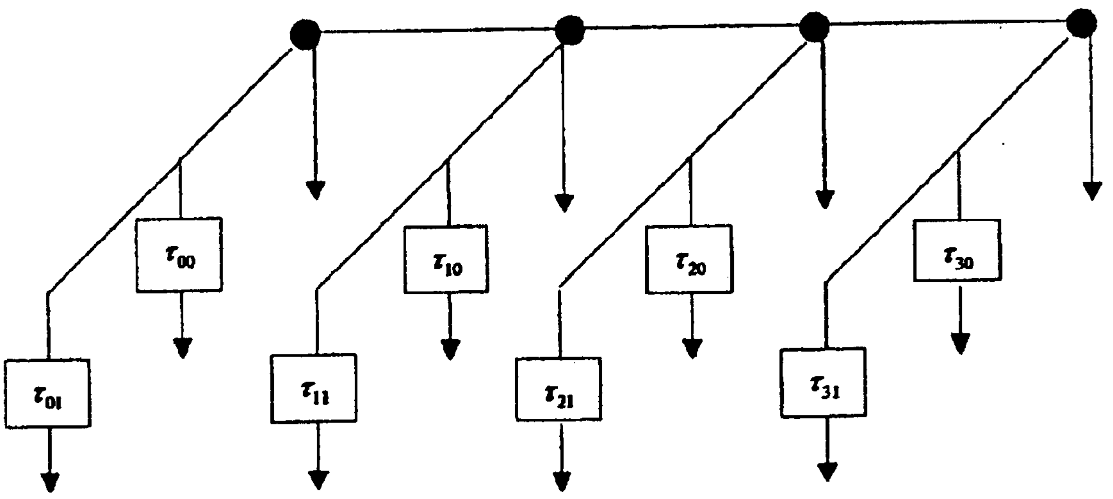
FIG. 5 shows a space-time array of antenna elements.

FIG. 5 shows a space-time array 104 of antenna elements. Space-time beam forming, in accordance with the present invention, is similar to the two-dimensional planar array beamforming process, except that one of the spatial dimensions of the planar array is replaced with a normalized time delay parameter, $\bar{t}$. The frame used in a space-time array is $$\{A_n\}=\{\rho_n(\theta)\exp(j\beta(d_n\sin\theta+(\bar{t}-\tau_{nk})))\}_{n=0,k=0}^{N-1,K-1},$$

where $\tau_{nk}$ is the kth time sampling interval for the nth element. This permits precise beamforming of practically arbitrary patterns $F(\theta,\bar{t})$ and permits both non-uniform inter-element spacing and non-uniform time sample duration. Using spatial-time beamforming results in superior beam performance and significant savings, because beams can be formed that share both space and time. Antenna radiation patterns formed from the above frames are very useful in reducing interference between times slots because the beams can be synchronized in time as well as in specific time slots in a TDMA (Time Division Multiple Access) system, such as Global Systems for Mobil (GSM) communications. A beam having space and time dependencies not only has superior beam performance but also significant savings because the prior art of hardware on-and-off switching of the beam is not required. Instead, the time dependency is included, naturally, in the element weights $w_n(\theta,\bar{t})=\langle B_n|F(\theta,\bar{t}\rangle$. Furthermore, this time dependency can be shaped to avoid unwanted modulation effects that spill over into frequency bands outside of the allocated band.

Figure 6:
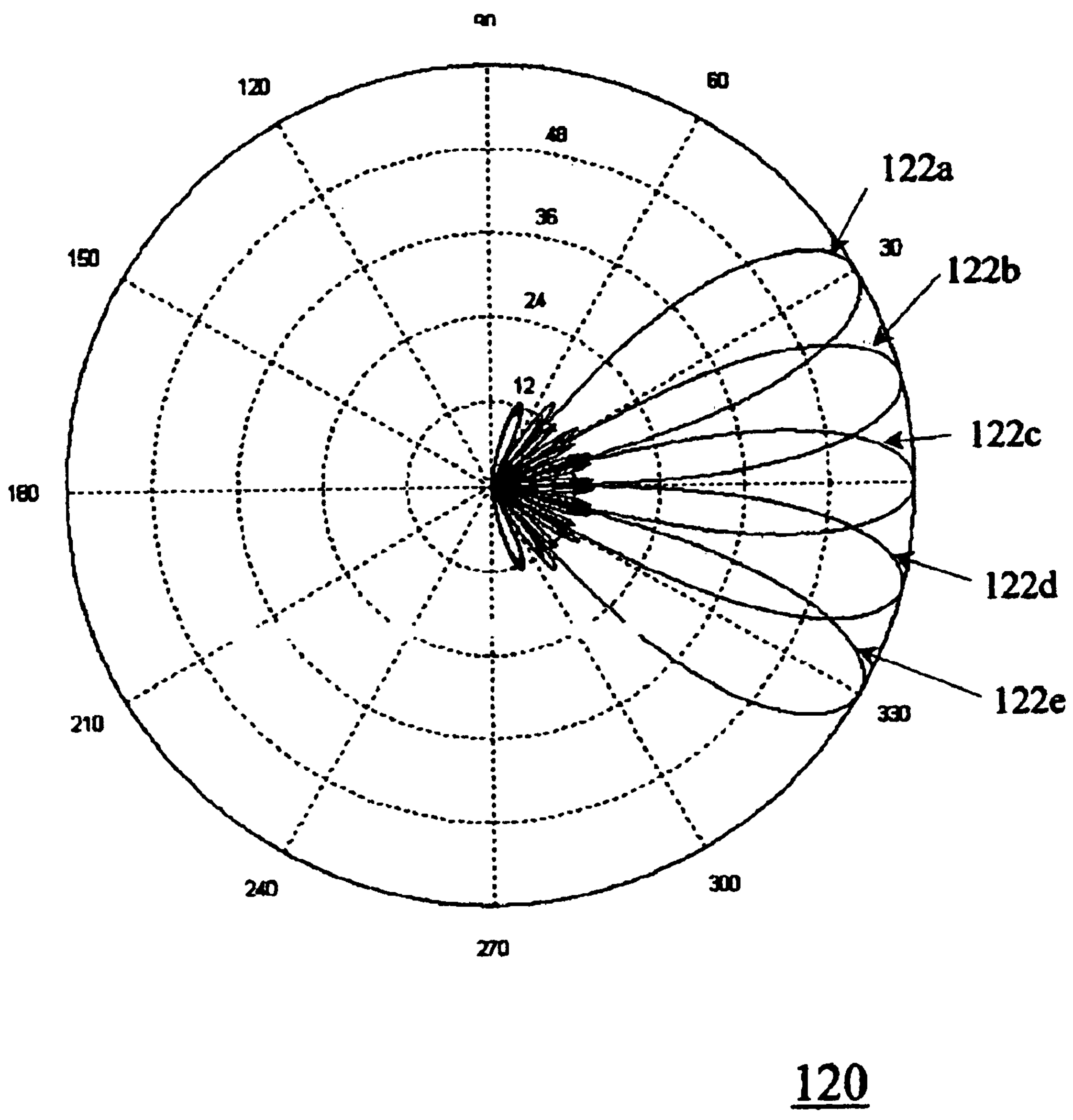
FIG. 6 shows an array with multiple high quality beams and very low side lobe levels.

FIG. 6 shows a beam pattern 120 with multiple high quality beams 122*a–e* and very low side lobe levels 124. The pattern, shown in FIG. 6, has a set of multiple beams 122*a–e* generated from 16 elements. The side lobe levels (SLL) are at about 50 dB below the main beams. Even lower SLL is possible according to the present invention, by careful specification of the array pattern function F(θ). Specification of the pattern function includes properly sampling the basic element pattern $\rho_n(\theta)$ at specific angles based on the number of elements in the array, as described above.

Figure 7:
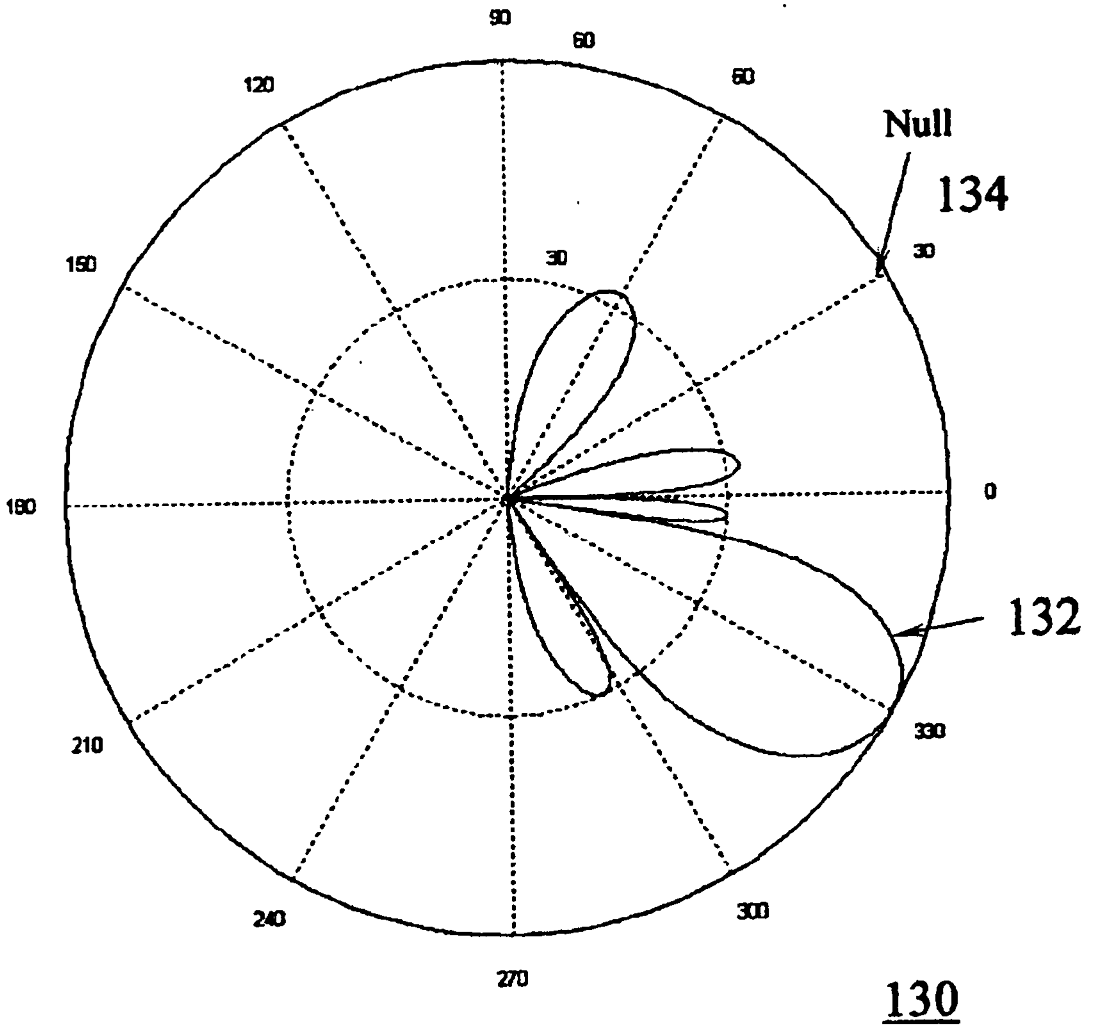
FIG. 7 shows an array with a beam pattern designed in accordance with the present invention, the beam pattern including a desired beam in one direction and a desired null in another direction.

FIG. 7 shows an array with a beam pattern 130 designed in accordance with the present invention, where the beam pattern includes a desired beam 132 in one direction and a desired null 134 in another direction. The figure shows the case in which a beam 132 and a null 134 are created at two directions that are potentially sharing frequencies or multiple access codes to conserve spectrum space, say within a cell. For best results, the approximate null and peak beam locations in the pattern function F(θ) should coincide with the sampling angles of the pattern function F(θ).

Figure 8:
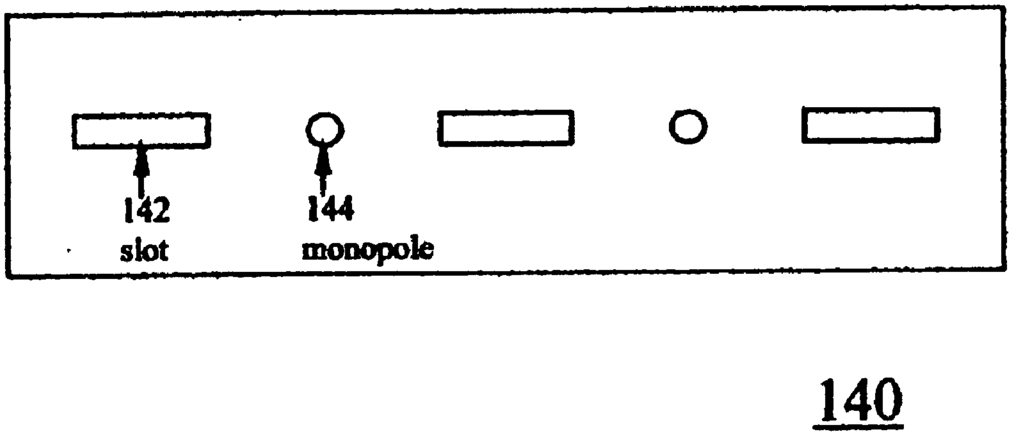
FIG. 8 shows the use of different types of antenna elements in the same array.

FIG. 8 shows the use of different types of antenna elements 142 (slot), 144 (monopole) in the same array 140, in accordance with the present invention thus illustrating that the frame functions $\{A_n\}$ of the present invention need not all be of the same type. If it is determined that a higher quality array would result from the combination of array elements of different types, then each frame function $A_n$ should be chosen according to the type of element needed for the higher quality array. The different array elements only enrich and enlarge the array subspace spanned by the array elements, because the use of frames benefits from adding redundant functions to the array subspace. Thus, in accordance with the present invention, different element patterns $\{\rho_n^{(m)}(\theta)\}$ are specified, where the superscript m specifies the type of element among a number of different types and the subscript n specifies the number of elements for a given type m.

Array element spacing of a given antenna system may require very tight control but this control can be costly when an antenna array is to operate at very high frequency. Furthermore, even if accurate element spacing is achieved, the cable connection and cable length variations would still cause phase differences that would not have been accounted for in the design. Conventional design would require that each element be separately tuned. However, the present invention takes irregularities in the spacing and phasing of the element into account naturally. The spacing is selected and space and phase variations are compensated in the dual frame calculation so that the antenna radiation pattern is precise. Sidelobes are kept to their mathematically lowest levels, when the antenna radiation pattern is formed according to the present invention.

To include phase and spacing differences into the antenna radiation pattern, the array element phase differences are measured once the antenna body and cables are physically laid out. These phase differences are then translated into spacing variations and added to the spacing parameters of each array element.

Figure 9A:
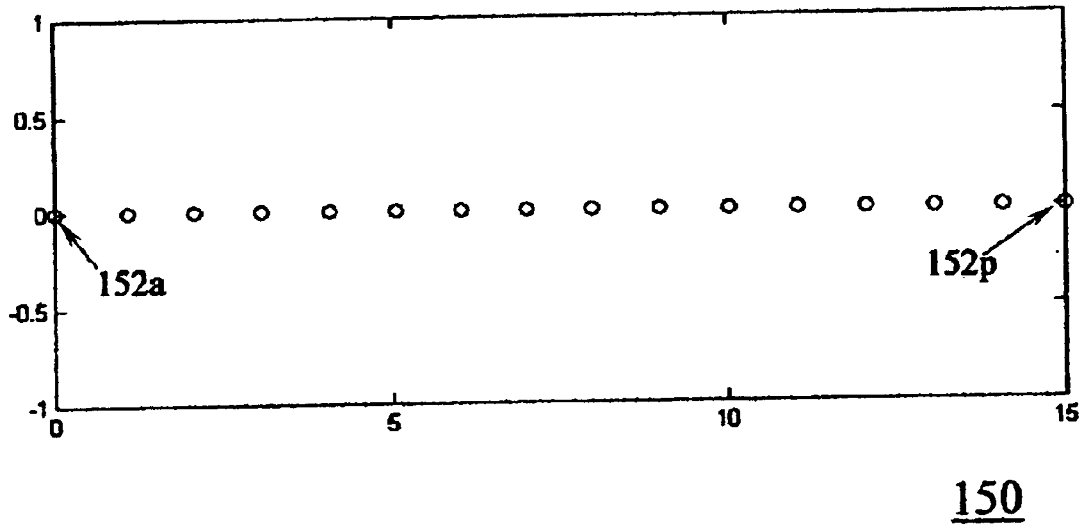
FIG. 9A shows a linear array formed from elements having small random element spacings.
Figure 9B:
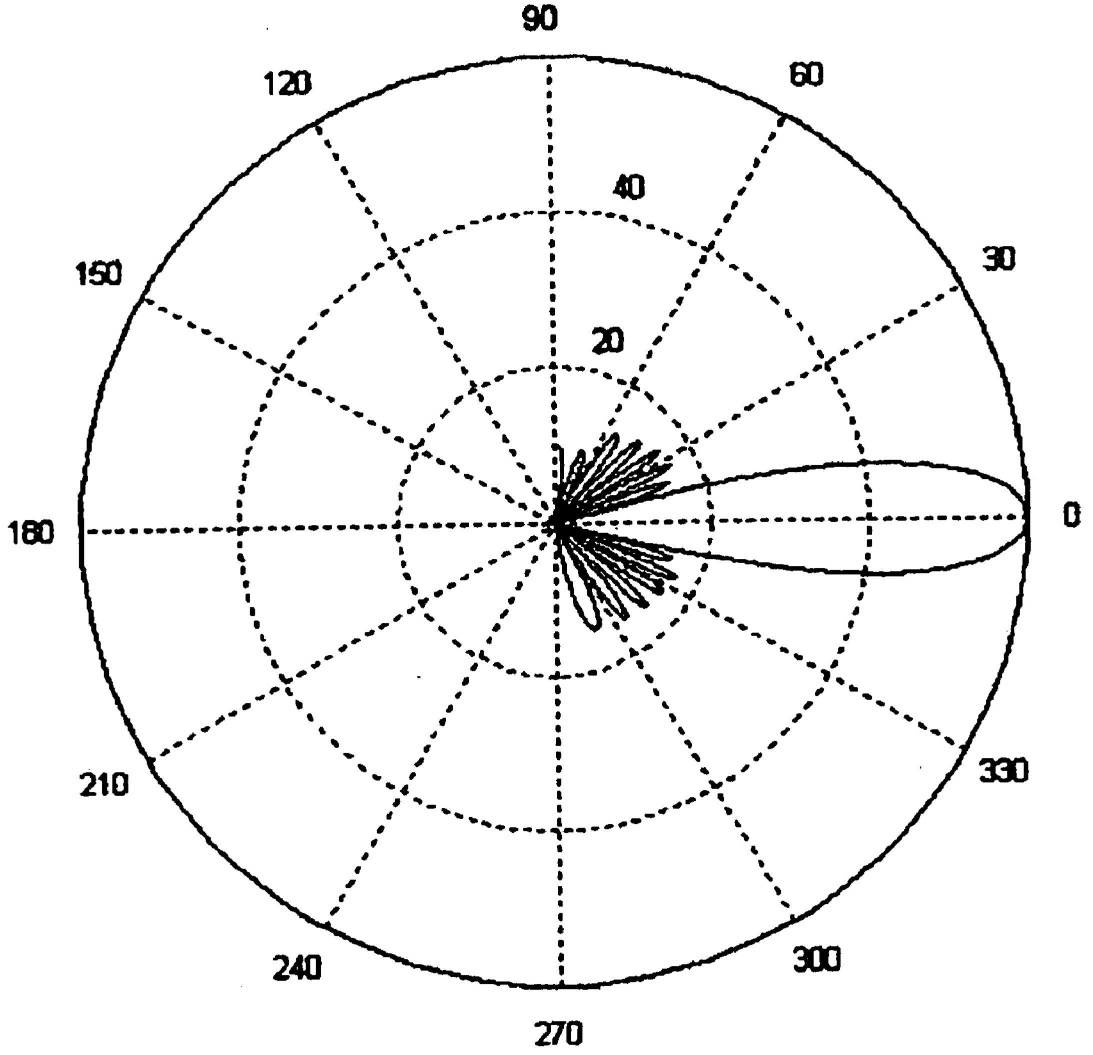
FIG. 9B shows a beam pattern of the linear array of FIG. 9A.
Figure 9C:
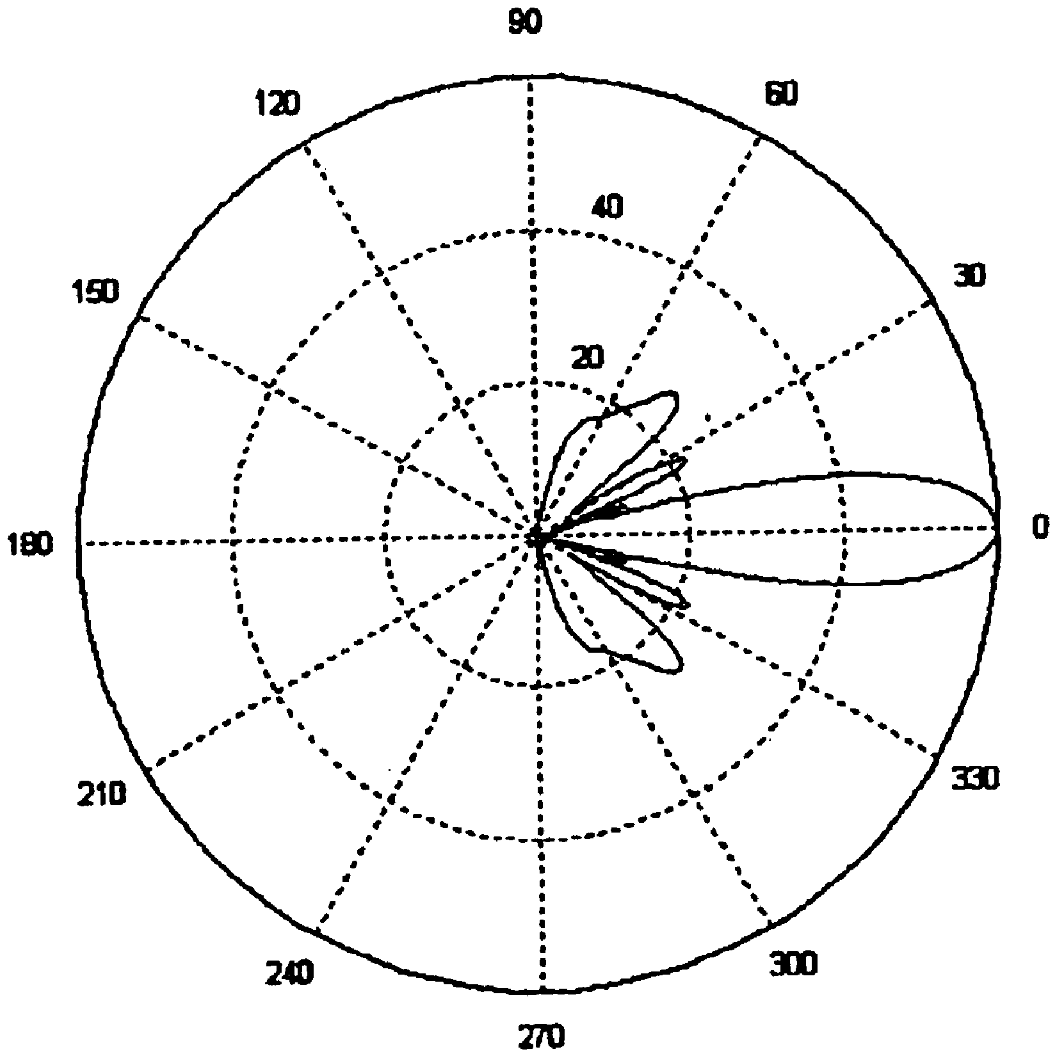
FIG. 9C shows a beam pattern of the linear array of FIG. 9A with small random element spacings but with uniform spacing element weights.

FIG. 9A shows a linear array 150 formed from elements 152*a–p* having small random element spacings that might be encountered when taking phase and spacing variations into account. Small random variations are well-compensated so that the beams formed have −50 dB side lobe levels, as shown in FIG. 9B, which shows a beam pattern 160 of the linear array of FIG. 9A. In contrast, a conventional design that does not take the spacing variations into account has a SLL of about −33 db as shown in FIG. 9C, which shows a beam pattern 164 of the linear array of FIG. 9A with small random element spacings but with uniform spacing element weights. FIG. 9C has about 17 db SLL deterioration compared to the beam 160 in FIG. 9B.

Non-Uniform Array for Enhanced Beam Quality

Figure 10A:
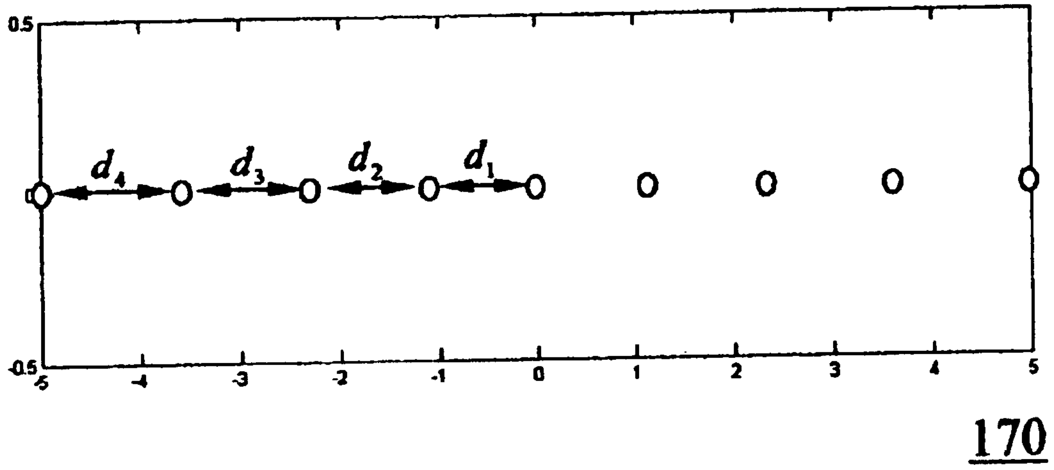
FIG. 10A shows a linear array with non-uniform placement of elements for improved performance.
Figure 10B:
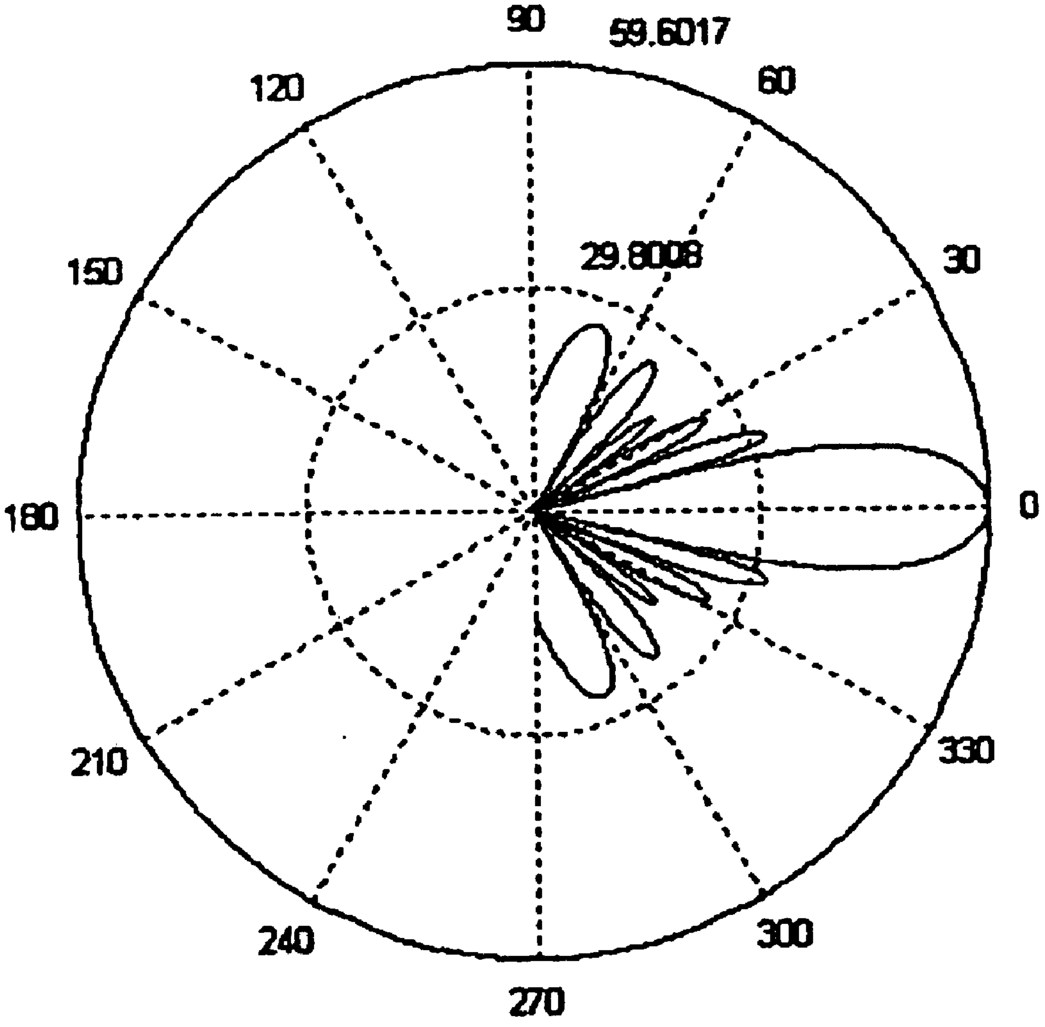
FIG. 10B shows a beam pattern of the linear array of FIG. 10A with non-uniform placement of element for improved performance.
Figure 10C:
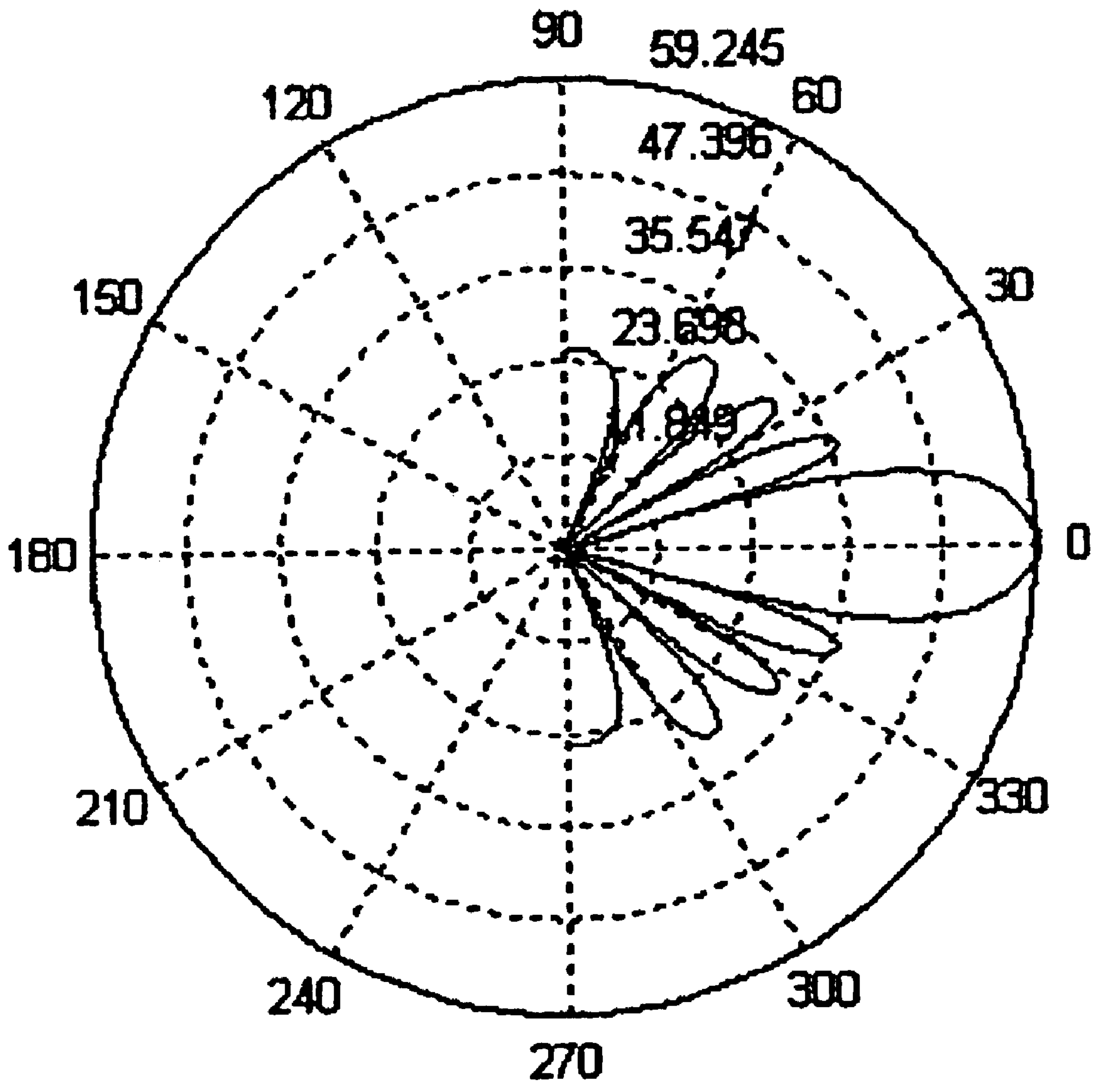
FIG. 10C shows a beam pattern of the linear array of FIG. 10A with uniformly placed elements.

FIG. 10A shows a linear array 170 with non-uniform placement of elements for improved performance. FIG. 10B shows a beam pattern 172 of the linear array of FIG. 10A with non-uniform placement of elements for improved performance and FIG. 10C shows a beam pattern 174 of the linear array of FIG. 10A with uniformly placed elements. The beam pattern of FIG. 10B has a narrower beam width and reduced side lobe levels (−30 dB), thus taking the non-uniform spacing into account, in accordance with the present invention. FIG. 10C shows the resulting beam pattern of the prior art which does not recognize the non-uniform spacing. As can be seen, the beam formed by the processes of the present invention is a beam having a narrower beamwidth and a SLL reduced by about 8 dB.

Array Spacing Less than ½ Wavelength

Figure 11:
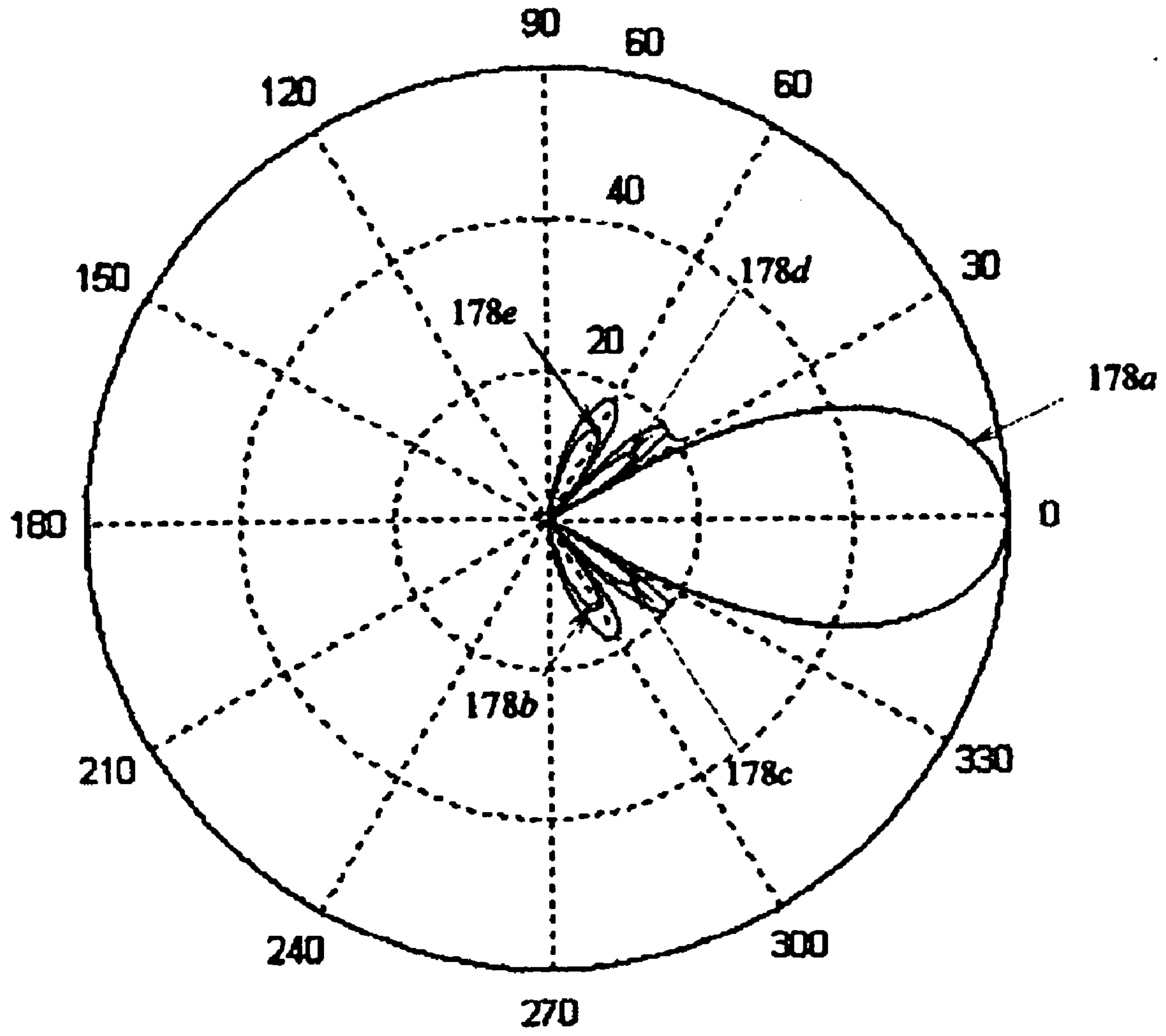
FIG. 11 shows a beam pattern of a linear array with ½ and ¼ wavelength spacings.

Most conventional array systems cannot easily deal with elements spaced at less that ½ wavelength. If a conventional system attempts to define an antenna array system at less than ½ wavelength spacing, it is usually under severe constraints. For example, one method has a restriction that there must be an odd number of array elements if the spacing is less than ½ wavelength. However, in the present invention, less-than ½-wavelength spacing is permitted because the frame approach handles irregular spacing of the array frame elements. The irregular spacing amounts to a non-orthogonal and an over-sampled (redundant) array frame. The spatial subspace generated by the less than ½ wavelength-spaced array frame stays the same. Because of the redundancy, such an array frame is more robust and performs at least as well, if not better than, a ½ wavelength-spaced array. FIG. 11 shows a beam pattern 176 of a linear array with ½ and ¼ wavelength spacings. With half-wavelength operation and the additional elements, the SLL is actually improved by 7 dB compared to an antenna with only ½ wavelength spacing. Thus, not only is the present invention able to handle the case of less than ½ wavelength spacing, the present invention shows improved performance in such a case.

Multi-Band Antenna Systems

For certain antenna designs such as micropatch antennas, it is possible to build a multi-band antenna in a single structure having shared elements. For example, a dual band antenna can be constructed with shared element, where the first frequency is typically a multiple of a second frequency. If the first frequency is twice that of the second frequency, then an array system constructed for the first (higher) frequency (with spacing of approximately $\lambda_1/2$) operates simultaneously for the lower frequency (with a spacing of $\lambda_2/4$). Thus, the multi-band system is actually one in which, for the lower frequency, there are more than the needed number of elements, with spacing less than ½ wavelength, a condition described above. Each and every element of the antenna is used (rather than using every other element) thereby achieving an antenna array with improved performance.

To construct a dual band antenna array, in accordance with the present invention, the element patterns $\{\rho_n\}$, $\{\rho_m\}$ must be measured or otherwise determined for each of the two frequencies, because the elements behave very differently at each frequency. A power divider or power combiner is used to divide or combine the two band cables to the array and the element spacing and phasing is also measured. The element patterns and adjusted element spacings are then used to define the frames $\{A_n\}$, $\{A_m\}$. Following the above steps for computing the element weights yields a set of element weights $w_n=\langle B_n|F(\theta)\rangle$, $\forall n$ for the first frequency and a set of element weights $w_m=\langle(B_m|F(\theta)\rangle$, $\forall m$ for the second frequency. FIG. 11 shows an array formed to operate with two frequency bands.

Composition of the Radiation Pattern from Preformed Beams (Beam-Space Beam-Forming)

Often, it is desirable to form an antenna radiation pattern $F(\theta)_{COMP}$ based on a set of preformed beams. Conventional (beam-space) beam-forming techniques require that the preformed beams be orthogonal which means that each beam is independent of the other beams, i.e., a signal in one of the beams being completely absent in the other beams. In practice, this requirement is often impossible to achieve. However, the present invention has no such requirement.

Figure 12:
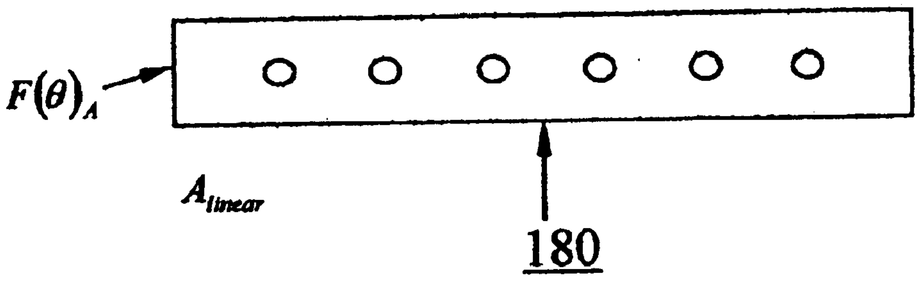
FIG. 12 shows exemplary pre-formed beam element arrays for constructing a pre-formed beam system.
Figure 12:
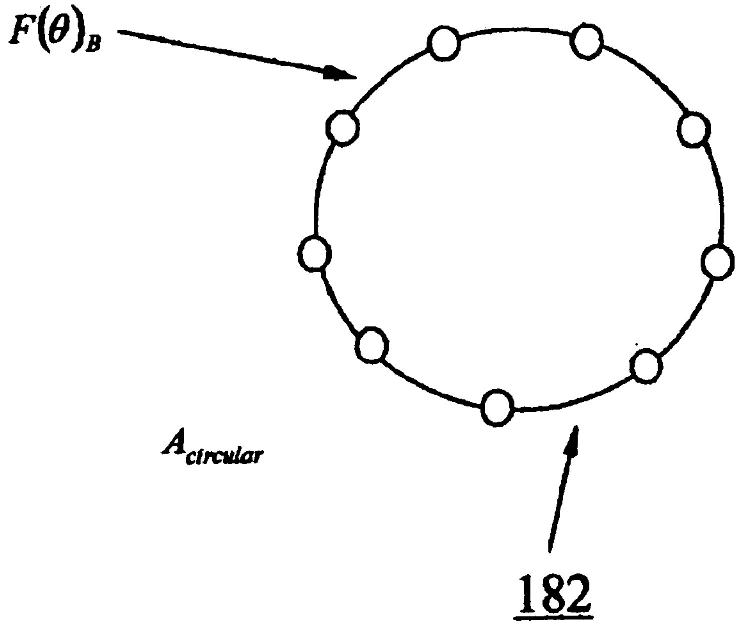

Precision beam forming is carried out with either orthogonal or non-orthogonal sets of preformed beams. Preformed beams $F_A$ $F_B$, whether in a given array or distributed over several antenna systems or towers are treated as antenna elements in a generalized planar array. The pre-formed beams function as a frame $\{A_n\}_{PRE}=\{A_{LINEAR},A_{CIRCULAR}\}$ and beamforming with these beams simply requires the computation of the dual frame $\{B_n\}_{PRE}$ (i.e. dual, pre-formed beam frame) so that the beamforming weights $w_m=\langle B_{nPRE}|F(\theta)_{COMP}\rangle$, $\forall n$ can be computed. FIG. 12 shows exemplary pre-formed beam element arrays 180, 182 for constructing a composite beam system.

To take advantage of this aspect of the present invention, the "preformed beams" themselves are designed according to the methods described above, using basic antenna elements as a frame $\{A_n\}$ and the element weights $w_n$ are determined to construct the "preformed beam." Next, the preformed beams are treated as antenna elements $\{A_n\}_{PRE}$ of the composite antenna system and their spacing $d_n$ is determined. As above, the spacing can include phase differences between the preformed beams that may need to be taken into account. Following this, the weights of the preformed beams are determined to construct a composite antenna using the preformed beams.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for constructing an antenna system from a plurality of antenna elements, the method comprising:

specifying an antenna system radiation pattern function that describes the transmission or reception pattern of the antenna system;

determining an element radiation pattern function for each element of the antenna system, each element radiation pattern function including a basic element pattern specification, a frequency of operation and at least one spacing parameter that specifies the location of the element in the antenna system;

determining a value for the at least one spacing parameter;

forming a set whose elements are the element radiation pattern functions and imposing a condition on the elements of the set such that the set is identifiable as a first frame;

determining a second frame that is a dual of the first frame, the second frame having an equal number of elements as the first frame;

determining an element weight coefficient for each antenna element based on the elements of the second frame and the specified antenna system radiation pattern function; and constructing the antenna system from the plurality of antenna elements according to the at least one spacing parameter and determined element weight coefficients for each element at the frequency of operation.

2. The method for constructing an antenna system as recited in claim 1, wherein the antenna system is a linear array of antenna elements; and wherein the value of the spacing parameter of each element causes the spacing between adjacent elements of the linear array to be substantially uniform.

3. The method for constructing an antenna system as recited in claim 2, wherein the spacing between adjacent antenna elements is ½ wavelength that corresponds to the frequency of operation.

4. The method for constructing an antenna system as recited in claim 2, wherein the spacing between adjacent antenna elements is less than ½ wavelength that corresponds to the frequency of operation.

5. The method for constructing an antenna system as recited in claim 4, wherein the spacing between adjacent antenna elements is ¼ wavelength that corresponds to the frequency of operation.

6. The method for constructing an antenna system as recited in claim 2, wherein the spacing between adjacent elements is uniform but with small, random variations.

7. The method for constructing an antenna system as recited in claim 1, wherein the value of the spacing parameter of each element causes the spacing between adjacent elements to be non-uniform.

8. The method for constructing an antenna system as recited in claim 7, wherein a center element is taken as a reference element and the spacing between adjacent elements is such that elements farther from the center element have a greater deviation from a uniformly spaced position for the element.

9. The method for constructing an antenna system as recited in claim 1, wherein the antenna system is a linear array of antenna elements;

wherein the linear array has a first and a second frequency of operation, the first frequency of operation being an integer multiple of the second frequency of operation and each antenna element having an element radiation pattern function for the first frequency and the second frequency of operation;

further comprising:

forming an additional set of functions for each element from the element radiation pattern functions for the second frequency, wherein the first frame is identified with the set of element radiation pattern functions for the first frequency and a third frame is identified with the set element radiation pattern functions for the second frequency;

determining a fourth frame that is a dual of the third frame, the fourth frame having an equal number of elements as the third frame; and determining an additional element weight coefficient for each element based on the fourth frame and the specified antenna system radiation pattern function; and wherein the step of constructing the antenna system according to the determined element weight coefficients for each element at the frequency of operation includes constructing the antenna system according to the element weight coefficients for the first frequency and second frequency of operation.

10. The method for constructing an antenna system as recited in claim 9, wherein the first frequency of operation is twice the second frequency of operation.

11. The method for constructing an antenna system as recited in claim 1, wherein each antenna element has a relative phase difference associated therewith to account for any physical differences of the element; and wherein the relative phase difference is translated to a spacing difference and included in the value of the spacing parameter of each element.

12. The method for constructing an antenna system as recited in claim 1, wherein the antenna system is a planar array of antenna elements; and wherein the value of the spacing parameter of each element causes the spacing between adjacent elements of the planar array to be substantially uniform.

13. The method for constructing an antenna system as recited in claim 1, wherein the antenna system is a planar array of antenna elements; and wherein the value of the spacing parameter of each element causes the spacing between adjacent elements of the planar array to be non-uniform.

14. The method for constructing an antenna system as recited in claim 13, wherein the non-uniform spacing between adjacent planar elements forms a circular array.

15. The method for constructing an antenna system as recited in claim 1, wherein the antenna elements are positioned to form a circular array; and wherein the value of the spacing parameter of each element causes the spacing between adjacent elements of the circular array to be substantially uniform along the circumference of the circle.

16. The method for constructing an antenna system as recited in claim 1, wherein the antenna elements are positioned to form a circular array; and wherein the value of the spacing parameter of each element causes the spacing between adjacent elements of the circular array to be non-uniform along the circumference of the circle.

17. The method for forming a beam for an antenna system that includes a plurality of antenna elements, the method comprising:

specifying an antenna system radiation pattern function that describes the transmission or reception beam of the antenna system;

determining an element radiation pattern function for each element of the antenna system, each element radiation pattern function including a basic element pattern specification, a frequency of operation and at least one spacing parameter that specifies the location of the element in the antenna system;

determining a value for the at least one spacing parameter;

forming a set whose elements are the element radiation pattern functions and imposing a condition on the elements of the set such that the set is identifiable as a first frame;

determining a second frame that is a dual of the first frame, the second frame having an equal number of elements as the first frame; and determining an element weight coefficient for each antenna element based on the elements of the second frame and the specified antenna system radiation pattern function, wherein the element weight coefficient and the element radiation pattern function combine to make the beam.

18. The method for forming a beam for an antenna system as recited in claim 17, wherein the step of determining element weight coefficients includes:

representing the second frame as a matrix and the system radiation pattern function as a vector; and computing an inner product of the second frame matrix and the antenna system radiation pattern vector.

19. The method for forming a beam for an antenna system as recited in claim 18, wherein the antenna system radiation pattern is sampled at a number of sampling angles; and wherein the antenna system radiation pattern vector includes an number of elements, the number of vector elements depending on the number of sampling angles.

20. The method for forming a beam for an antenna system as recited in claim 18, wherein the step of representing the second frame as a matrix includes:

representing the first frame as a matrix;

computing a frame operator based on the first frame matrix;

determining the inverse of the frame operator; and computing the second frame based on the inverse of the frame operator and the first frame matrix.

21. The method for forming a beam for an antenna system as recited in claim 18, wherein the step of representing the second frame as a matrix includes:

representing the first frame as a matrix; and computing the second frame based on the first frame matrix.

22. The method for forming a beam for an antenna system as recited in claim 21, wherein the step of computing the second frame based on the first frame matrix includes computing a pseudo-inverse of the first frame matrix.

23. The method for forming a beam for an antenna system as recited in claim 17, wherein each antenna element has a relative phase difference associated therewith to account for any physical differences relating to the element; and wherein the relative phase difference is translated to a spacing difference and included in the value of the spacing parameter of each element.

24. The method for forming a beam for an antenna system as recited in claim 17, wherein each element radiation pattern function includes a timing parameter that specifies when an element radiation pattern becomes active within the system; and wherein the specified beam has time dependencies based on the timing parameters of the elements.

25. The method for forming a beam for an antenna system as recited in claim 17, wherein at least one element radiation pattern is different from the element radiation patterns of the other elements.

26. The method for forming a beam for an antenna system 25, wherein the at least one element radiation pattern is a pattern for a monopole and the other element radiation patterns are patterns for a slot antenna.

27. The method for forming a beam for an antenna system as recited in claim 17, wherein the value of the at least one spacing parameter of each element provides for uniform spacing between the antenna elements.

28. The method for forming a beam for an antenna system as recited in claim 17, wherein one or more of the antenna elements has an element radiation pattern function that is substantially different from the other antenna elements due to a complete or partial failure of the one or more elements.

29. The method for forming a beam for antenna systems each including a plurality of antenna elements, the method comprising:

specifying a composite antenna system radiation pattern function that describes the transmission or reception of first and second antenna systems at a specified frequency of operation;

obtaining a first antenna system radiation pattern function that describes the transmission or reception pattern of a first antenna system at the specified frequency of operation;

obtaining a second antenna system radiation pattern function that describes the transmission or reception pattern of a second antenna system at the specified frequency of operation;

determining a value of a spacing parameter between the first antenna system and the second antenna system;

forming a set whose elements are the first and second antenna system radiation pattern functions and imposing a condition on the elements of the set such that the set is identifiable as a first frame;

determining a second frame that is a dual of the first frame; and determining an element weight coefficient for each antenna system based on the second frame and the specified composite antenna system radiation pattern function, wherein the element weight coefficient and the antenna system radiation pattern functions combine to form the beam.

* * * * *